(12) United States Patent
Wigren

(10) Patent No.: US 9,491,715 B2
(45) Date of Patent: Nov. 8, 2016

(54) THERMAL NOISE POWER FLOOR ESTIMATION

(71) Applicant: TELEFONAKTIEBOLAGET L M ERICSSON (PUBL), Stockholm (SE)

(72) Inventor: Torbjörn Wigren, Uppsala (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 123 days.

(21) Appl. No.: 14/401,734

(22) PCT Filed: May 17, 2013

(86) PCT No.: PCT/SE2013/050562
§ 371 (c)(1),
(2) Date: Nov. 17, 2014

(87) PCT Pub. No.: WO2013/176604
PCT Pub. Date: Nov. 28, 2013

(65) Prior Publication Data
US 2015/0141069 A1 May 21, 2015

Related U.S. Application Data

(60) Provisional application No. 61/650,574, filed on May 23, 2012, provisional application No. 61/650,508, filed on May 23, 2012.

(51) Int. Cl.
*H04B 7/00* (2006.01)
*H04W 52/24* (2009.01)
(Continued)

(52) U.S. Cl.
CPC ............ *H04W 52/243* (2013.01); *G06F 1/035* (2013.01); *H04B 1/1027* (2013.01); *H04B 17/345* (2015.01); *H04W 24/00* (2013.01); *H04W 52/343* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,708,042 B1* | 3/2004 | Hayakawa | H04W 52/34 370/252 |
| 2005/0192042 A1* | 9/2005 | Au | H04W 28/22 455/522 |

(Continued)

FOREIGN PATENT DOCUMENTS

| | | |
|---|---|---|
| WO | 2008039123 A1 | 4/2008 |
| WO | 2008041895 A1 | 4/2008 |

OTHER PUBLICATIONS

Wigren, "Recursive noise floor estimation in WCDMA" IEEE Transactions on Vehicular Technology vol. 59, No. 5, Jun. 1, 2010, Piscataway, NJ, US, ISSN 0018-9545 pp. 2615-2620, XP011304938.

(Continued)

*Primary Examiner* — Dominic Rego
(74) *Attorney, Agent, or Firm* — Patent Portfolio Builders, PLLC

(57) ABSTRACT

Embodiments herein relate to a method in a radio base station (12) for handling a thermal noise power floor in a thermal noise power floor estimation process. The radio base station (12) determines a change or a rate of change of a thermal noise power floor estimate relative a previous thermal noise power floor estimate. When the change or rate of change exceeds a threshold value, the radio base station (12) performs one or more of the following: setting a limitation of the change or rate of change to be below the threshold; adjusting of a scaling power, and reducing an estimated mean power level with a quantity dependent on a reduction of the thermal noise power floor estimate.

14 Claims, 13 Drawing Sheets

(51) Int. Cl.
| | |
|---|---|
| *H04W 24/00* | (2009.01) |
| *H04B 17/345* | (2015.01) |
| *H04W 52/34* | (2009.01) |
| *G06F 1/035* | (2006.01) |
| *H04B 1/10* | (2006.01) |
| *H04W 88/08* | (2009.01) |

(56) References Cited

U.S. PATENT DOCUMENTS

2008/0039142 A1 2/2008 Curtis et al.
2008/0227400 A1* 9/2008 Wigren ............... H04B 1/7097
455/67.13

OTHER PUBLICATIONS

R. Johansson: "Metod för att optimera missilestimator" Examensarbete, Lulea Tekniska Universitet, CivilingenJörsprogrammet, Datateknik, [Online] 2006, ISSN 1402-1617 ISSN: 1402-1617 Retrieved from the Internet: [retrieved on Jan. 13, 2014], 73 pages.

R. Y. Novoselov et al. "Mitigating The Effects of Residual Biases With Schmidt-Kalman Filtering" Information Fusion, 2005 7th International Conference on Philadelphia, PA, USA vol. 1, Jul. 25, 2005-Jul. 28, 2005, Piscataway, NJ, USA, pp. 358-365, XP010892313.

Wigen, "Soft Uplink Load Estimation in WCDMA", IEEE Transactions on Vehicular Technology, vol. 58, No. 2, Feb. 2009, pp. 760-772.

Wigren et al. "Estimation of uplink WCDMA load in a single RBS", IEEE, 2007, 5 pages.

Geijer Lundin, E. et al. "Adaptive filtering applied to an uplink load estimate in WCDMA," Division of communication Systems, XP010862165, 2003, pp. 7.

Office Action in EP application No. 13794426.0 mailed Jan. 14, 2016.

* cited by examiner

THERMAL NOISE POWER FLOOR ESTIMATION

CROSS REFERENCE TO RELATED APPLICATION(S)

This application is a 35 U.S.C. §371 National Phase Entry Application from PCT/SE2013/050562, filed May 17, 2013, designating the United States, and also claims the benefit of U.S. Provisional Application No. 61/650,574, filed May 23, 2012, and 61/650,508, filed May 23, 2012. The disclosures of each of the referenced applications are incorporated herein in their entirety by reference.

TECHNICAL FIELD

Embodiments herein relate to a radio base station and a method therein. In particular embodiments herein relate to thermal noise power floor estimation.

BACKGROUND

In a typical cellular radio system or a radio communications network, wireless terminals, also known as mobile stations and/or user equipments (UEs), communicate via a radio access network (RAN) to one or more core networks. The radio access network covers a geographical area which is divided into cell areas, with each cell area being served by a base station, e.g., a radio base station (RBS), which in some networks also may be called, for example, a "NodeB" or "eNodeB". A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) for user equipments. In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS has an essentially "flat" architecture comprising radio base station nodes without reporting to RNCs.

Recently two main trends have emerged in the cellular telephony business. First mobile broadband traffic is more or less exploding in e.g. the WCDMA networks. The technical consequence is a corresponding steep increase of the interference in these networks, or equivalently, a steep increase of the load. This makes it important to exploit the load headroom that is left in the most efficient way. Secondly, radio communications networks are becoming more heterogeneous, with macro radio base stations being supported by micro radio base stations at traffic hot spots. Furthermore, WCDMA home base stations, also called femto radio base stations, are emerging in many networks. This trend clearly puts increasing demands on inter-cell interference management.

Below it is described the measurement and estimation techniques, needed to measure the instantaneous total load, also referred to as the Rise over Thermal, RoT, on the uplink air interface.

WCDMA Load

The Need for Accurate Load Estimation

The air interface load of the WCDMA uplink is a fundamental quantity for the scheduling, in the RBS, of Enhanced Uplink (EUL) user equipments.
the admission and congestion control algorithms, in the RNC, that also control
the load created by release 99 user equipments.

There are several reasons for this. Firstly, the fast inner power control loop coupling between user equipments can create instability if too much load is allowed in the uplink, the so called party effect. Such power rushes originate e.g. when a new high power user equipment is entering the uplink causing interference. Since the inner loop power control strives to maintain the Signal to Interference Ratio (SIR) at a specified level, the consequence is that the other user equipments of the cell increase their power, which in turn increases the interference and lead to additional power increases. At a certain point this process goes unstable with unlimited power increases of all user equipments in the uplink of the cell.

Secondly, it is well known that increased interference levels reduce the coverage, simply because a terminal or user equipment needs to transmit with a higher power to overcome an increased interference level. At the cell boundary, the UE power is hence saturated, meaning that the user equipment must move towards the base station, in case of interference, to be detected—hence the cell size is reduced.

Thirdly, the scheduling of enhanced uplink user equipments in the RBS does not account for release 99 legacy traffic from user equipments that do not support EUL. Even modern user equipments may lack support for EUL. In order to keep the air interface load under control, release 99 traffic must hence be monitored elsewhere. In WCDMA this control functionality is performed in the RNC, by the admission and congestion control algorithms. Since the consequences, instability and loss of coverage, are the same as for EUL user equipments when the air interface becomes over-utilized, it follows that also the admission and congestion control algorithms need to have access to a measure of the momentary air interface load.

Finally, it is crucial that the load measure is accurate. This follows since the load, which is expressed as a (noise) Rise over Thermal, see below, is usually limited to be below 10-15 dB. It also follows that any load estimation errors will require margins that reduce the limit of 10-15 dB to lower values, a fact that will reduce the cell capacity. Hence all quantities that are used to form the uplink air-interface load need to be estimated very accurately, say at a 0.1-0.2 dB level so as not to limit uplink mobile broadband performance.

Problems in WCDMA Load Estimation

It is well known that the load at the antenna connector of the WCDMA uplink is given by the noise rise, or Rise over Thermal, RoT(t), defined by $$RoT(t) = \frac{RTWP(t)}{N_0(t)}, \qquad \text{eq. (1)}$$

where $N_0(t)$ is the thermal noise level, also referred to as the noise floor level, the noise power floor level or the thermal noise power floor, as measured at the antenna connector. 't' denotes the time. It remains to define what is meant by RTWP(t). The definition used here is simply the total wideband power RTWP(t)

$$RTWP(t) = \sum_{k=1}^{K} P_k(t) + I^N(t) + N_0(t), \qquad \text{eq. (2)}$$

also measured at the antenna connector. Here $I^N(t)$ denotes the power as received from neighbour cells ($^N$) of the WCDMA system, and $P_k(t)$ is the power of the k:th user of the own cell. As will be seen below, the major difficulty of any RoT estimation algorithm is to separate the thermal noise power floor from the interference from neighbor cells.

Another specific problem that needs to be addressed is that the signal reference points are by definition at the antenna connector. The measurements are however obtained after the analogue signal conditioning chain, in the digital receiver. The analogue signal conditioning chain does introduce a scale factor error of about 1-3 dB, 1-sigma, that is difficult to compensate for. Fortunately, all powers of eq. (2) are equally affected by the scale factor error so when eq. (1) is calculated, the scale factor error is cancelled as $$RoT^{DigitalReceiver}(t) = \qquad \text{eq. (3)}$$
$$\frac{RTWP^{DigitalReceiver}(t)}{N^{DigitalReceiver}(t)} = \frac{\gamma(t)RTWP^{Antenna}(t)}{\gamma(t)N^{Antenna}(t)} = RoT^{Antenna}(t).$$

The superscripts $^{DigitalReceiver}$ and $^{Antenna}$ indicate quantities valid at the digital receiver and the antenna respectively, and $\gamma(t)$ denotes said scale factor error. In order to understand the fundamental problem of neighbor cell interference when performing load estimation, note that $$I^N(t)+N_0(t)=E[I^N(t)]+E[N_0(t)]+\Delta I^N(t)+\Delta N_0(t), \qquad \text{eq. (4)}$$

where E[ ] denotes mathematical expectation and where $\Delta$ denotes the variation around the mean. The fundamental problem can now be clearly seen. Since there are no measurements available in the RBS that are related to the neighbor cell interference, a linear filtering operation can at best estimate the sum $E[I^N(t)]+E[N_0(t)]$. This estimated sum cannot be used to deduce the value of $E[N_0(t)]$. The situation is the same as when the sum of two numbers is available. Then there is no way to figure out the values of the individual numbers. This issue is analyzed rigorously for the RoT estimation problem in [1] where it is proved that the thermal noise power floor is not mathematically observable.

The interference level in current cellular networks or radio communications networks is increasing fast today. This densification leads to new players entering the market. As a consequence, regulation on frequency separation between equipment emitting electromagnetic radiation is becoming more difficult to maintain. In some countries this regulation is already weak. Recently, operators in several countries have been experiencing problems with such interference of sources external to the cellular system, in this case the WCDMA system. The technical equipment causing this interference may be mobiles of other cellular networks, poor frequency planning, illegal radio equipment, distant radar transmitters, or distant TV transmitters, to mention a few.

The treatment of this interference varies depending on it's duration. In case the interference is of a duration comparable to the normal high traffic/high interference periods of the cells in question, no action can be taken. This follows since there are no measurements defined that can be used for separation of electromagnetic energy from neighbor cells and from sources external to the WCDMA system. In case the duration is significantly longer than the normal high traffic/high interference periods of the cells in question, it is reasonable to handle the interference as an increase of the thermal noise power floor of the cells in question, or equivalently an increase of the receiver noise factor of the RBS.

The effect on the performance of the uplink (UL) of the cell is a reduced throughput. This follows since there is an UL interference threshold above which a scheduler of the traffic is not allowed to go. This is exactly the same situation as when there is a lot of traffic in neighbor cells, this then reduces the amount of traffic that can be allowed in the own cell. The real problem is that if the in-band interference external to the WCDMA system persists for very long, then the throughput reduction may remain during all times of the day, a situation that is not acceptable for the operators.

The remedy to the problem, as stated above, is to accept the interference as an increase of the thermal noise power floor. Since the allowed interference threshold of the scheduler is effective relative to the thermal noise power floor, the throughput reduction in the UL is removed.

Due to reasons explained below, the thermal noise power floor (level) needs to be estimated in the RBS. This estimator encounters two major problems in case of in-band interference external to the WCDMA system. These coupled problems are:

The thermal noise power floor estimate needs to be maintained with high precision during "normal" periods of high traffic and also in situations with in-band external interference. The prior art algorithm is not robust enough to anticipate very high levels of interference in HetNets. This may cause the estimates of the thermal noise power floor to become too high during normal operation, which affects the planned performance of the UL of the cell negatively;

During very long duration of in-band external interference the thermal noise power floor estimate is allowed to increase, thereby removing the throughput reduction associated with the in-band interference. However, when the in-band interferer is turned off, most often this is an instantaneous turn-off, the interference drops. A remaining high thermal noise power floor estimate then allows severe over-scheduling, since the threshold is relative to the estimated thermal noise power floor. This is not acceptable. Hence the thermal noise power floor estimate needs to drop immediately, to the level without in-band interference. The prior art estimator is however not accurate enough immediately after such a negative transient change. This also affects the planned performance of the UL of the cell negatively.

Prior art noise floor tracking algorithms are somewhat prepared for noise floor tracking, allowing for delayed tracking of thermal noise power floor steps caused by longer term in-band interference. The input power scaling, see below, is a crucial ingredient for this. This is illustrated by FIG. 1. The time constant of the thermal noise power floor estimation algorithm is set to 40 h. The operation is as intended, however as can be seen in the FIG. 1 the standard deviation of the estimate increases immediately, causing the actual estimate to become more and more noisy. Power is defined along a y-axis and time is defined along an x-axis.

A problem may hence sometimes occur, e.g. when in-band interference steps occur, in that the thermal noise power floor estimate tends to become noisy, well before the actual step of the estimator is set to occur. This is illustrated in FIG. 1 in circled sections.

Moreover, when a large negative thermal noise power floor step occurs, the prior art algorithms do reduce the thermal noise power floor immediately. The consequence is that the thermal noise power estimate remains noisy for quite a long period of time, due the scaling of the standard deviation of the estimate. This results in a non-accurate estimation leading to a reduced performance of the radio communications network.

SUMMARY

An object of embodiments herein is to provide an efficient manner to estimate thermal noise power floor.

According to an aspect the object is achieved by a method in a radio base station for handling a thermal noise power floor in a thermal noise power floor estimation process. The radio base station determines a change or a rate of change of a thermal noise power floor estimate relative a previous thermal noise power floor estimate. The radio base station performs, when the change or rate of change exceeds a threshold value, one or more of the following: setting a limitation of the change or rate of change to be below the threshold; adjusting a scaling power, and reducing an estimated mean power level with a quantity dependent on a reduction of the thermal noise power floor estimate.

According to another aspect the object is achieved by a radio base station for handling a thermal noise power floor in a thermal noise power floor estimation process. The radio base station comprises a determining circuit configured to determine a change or a rate of change of a thermal noise power floor estimate relative a previous thermal noise power floor estimate. The radio base station further comprises a performing circuit configured to perform, when the change or rate of change exceeds a threshold value, one or more of the following operations: setting a limitation of the change or rate of change to be below the threshold; adjusting a scaling power, and reducing an estimated mean power level with a quantity dependent on a reduction of the thermal noise power floor estimate.

Embodiments herein relate to determine a change of thermal noise floor estimate and based on the change, rate of change or change value, perform certain actions. Thereby, the estimation is not so noisy but instead the increase of thermal noise power floor estimate is controlled in a robust manner by introducing a limitation of the change and/or a decrease of thermal noise power floor estimate is decreased in an efficient manner as the mean power level estimate is reduced.

BRIEF DESCRIPTION OF THE DRAWINGS

Embodiments will now be described in more detail in relation to the enclosed drawings, in which.

DETAILED DESCRIPTION

Figure 1:
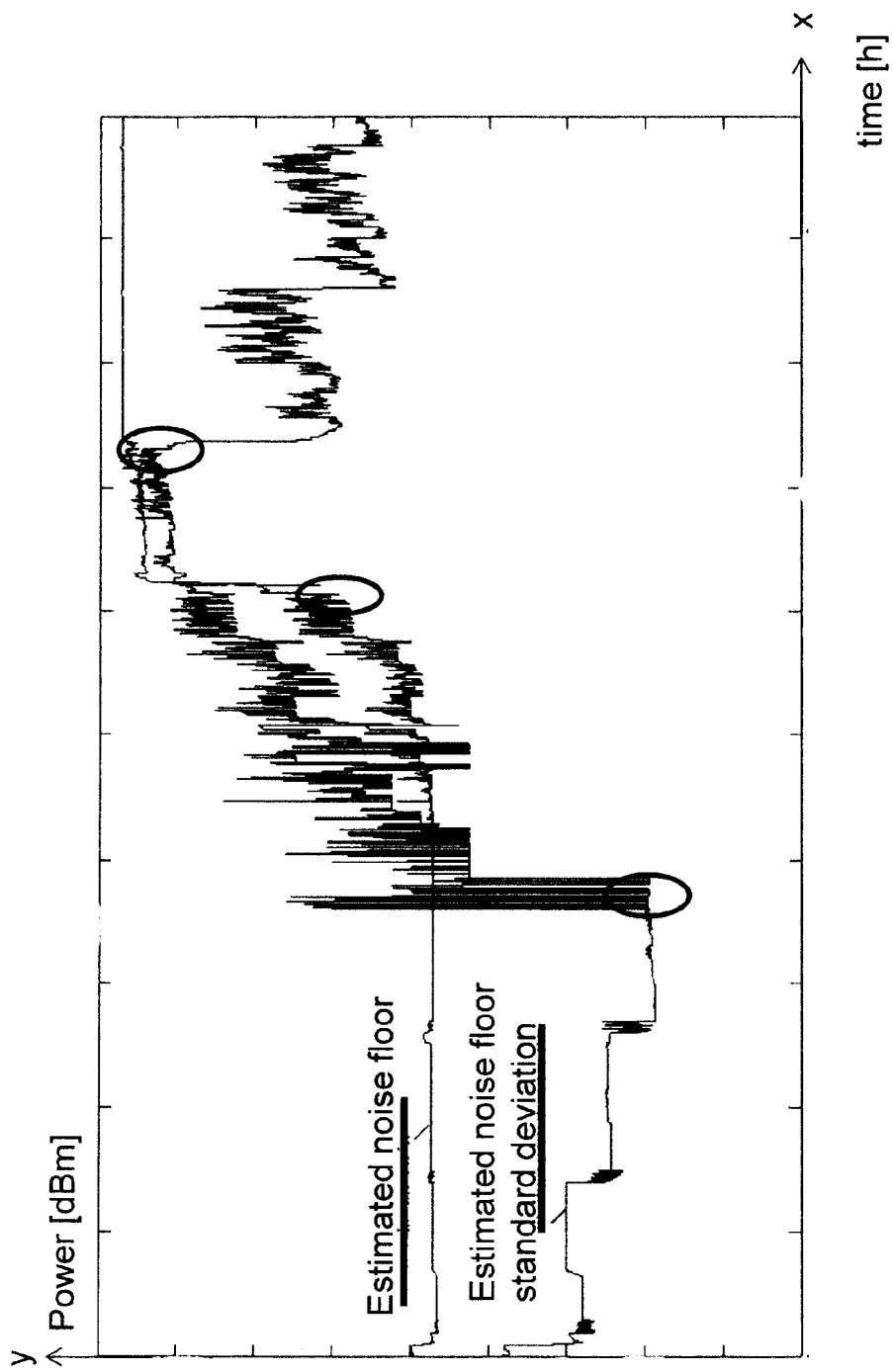
FIG. 1 is a graph depicting thermal noise power floor tracking in response to a 20 dB in-band non WCDMA interferer, step occurring after 72 h.
Figure 2:
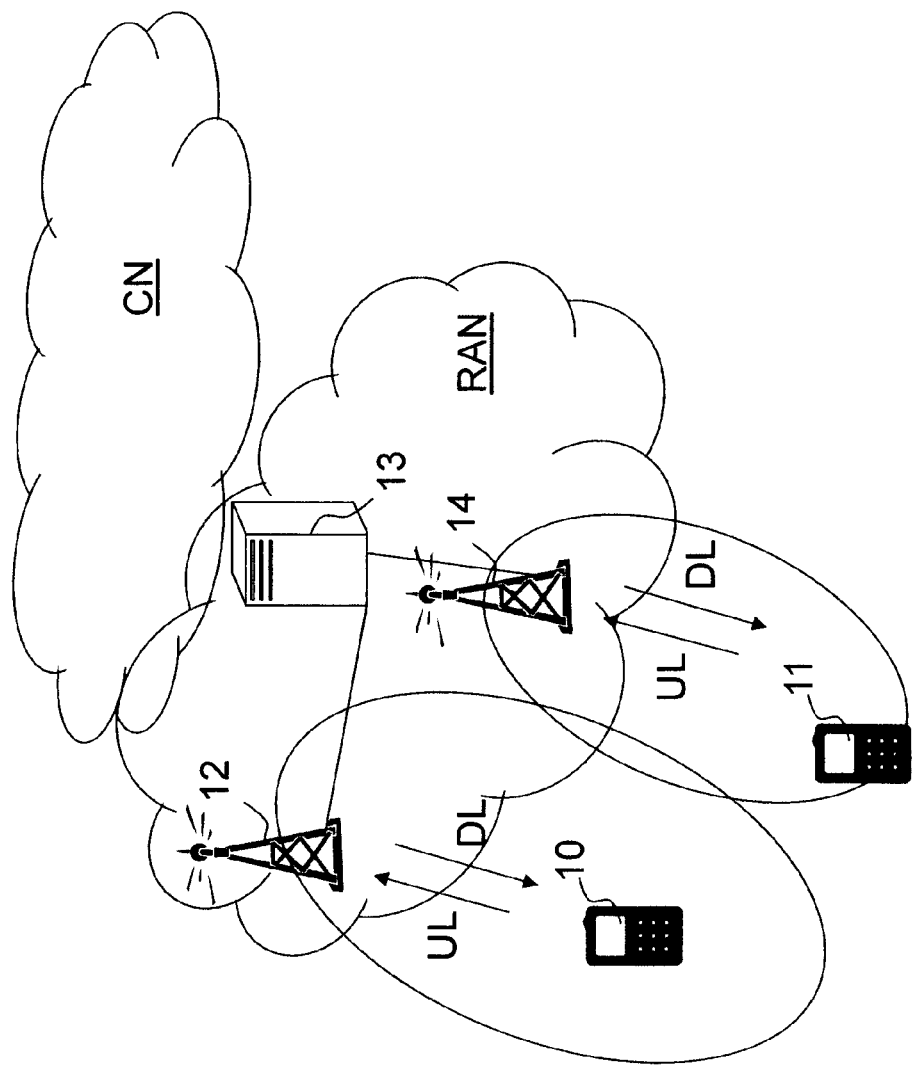
FIG. 2 is a schematic overview depicting a radio communications network according to embodiments herein.

FIG. 2 discloses a radio communications network 1. In today's radio communications networks a number of different technologies are used, such as LTE, LTE-Advanced, WCDMA, Global System for Mobile communications/Enhanced Data rate for GSM Evolution (GSM/EDGE), Code Division Multiple Access (CDMA) 2000, Worldwide Interoperability for Microwave Access (WiMax), or Ultra Mobile Broadband (UMB), just to mention a few possible implementations. The radio communications network 1 comprises a radio base station 12, may also be referred to as a first radio base station, in a RAN connected to a core network (CN). The radio base station 12 provides radio coverage over at least one geographical area forming a cell. The cell definition may also incorporate frequency bands used for transmissions, which means that two different cells may cover the same geographical area but using different frequency bands/carriers. User equipment (UE) 10, also referred to as a first user equipment, is served in the cell by the radio base station 12 and is communicating with the radio base station 12. It should be understood that the term "user equipment" is a non-limiting term which means any wireless terminal, device or node e.g. Personal Digital Assistant (PDA), laptop, mobile device, sensor, relay, mobile tablets, a Location Services (LCS) target device in general, an LCS client in the network or even a small base station. The user equipment 10 transmits data over an air or radio interface to the radio base station 12 in UL transmissions and the radio base station 12 transmits data over an air or radio interface to the user equipment 10 in downlink (DL)

transmissions. A second user equipment 11 is served in another cell by e.g. another radio base station 14, which may in fact be the same radio base station as the radio base station 12. UL transmissions from the second user equipment 11 may interfere at the radio base station 12. In e.g. WCDMA the radio base station 12 may be controlled by a RNC 13. The term RNC should here not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realised in the Base Station Controllers (BSC) of the CDMA 2000 network.

The radio base station 12 or stations, which is an example of a radio network node, may also be referred to as e.g. a NodeB, an evolved Node B (eNB, eNode B), a base transceiver station, Access Point Base Station, base station router, or any other network unit capable to communicate with the user equipment 10 within the cell depending e.g. of the radio access technology and terminology used. Also, the radio base station 12 may further serve one or more cells. Other examples of a radio network node serving the user equipments 10 is a relay node or a beacon node.

According to embodiments herein the radio base station 12 performs a thermal noise power floor estimation where the change or rate of change of the thermal noise power floor estimate is determined or monitored. The change or rate of change is compared to a threshold value. When the change or rate of change exceeds the threshold value, i.e. goes below or beyond the threshold value, depending whether the threshold is a lower limit or an upper limit, the radio base station 12 performs an action. In case the thermal noise power floor estimate is increasing and the change is above the threshold, the action may be to set a limitation of the change or rate of change to be below an increasing threshold; and/or adjusting a scaling power. In case the thermal noise power floor estimate is decreasing and the change is above a decreasing threshold, e.g. the a drop of the estimate is larger than a drop threshold, the action may be to reduce an estimated mean power level with a quantity dependent on a reduction of the thermal noise power floor estimate. Furthermore, also a re-initiation of a probability density function at a level indicated by the mean power level may be performed.

The limitation of the rate of change reduce the noisiness of the thermal noise power floor estimate at a step change, further it allows for an alarm to be triggered when rate limitation comes into effect.

The reduction of the mean power quantity reduces the variance of the input to the thermal noise power floor estimator, thereby providing a reduced noisyness after a negative step. The re-initiation improves the speed of re-convergence of the thermal noise power floor estimate, after a negative step.

Figure 3:
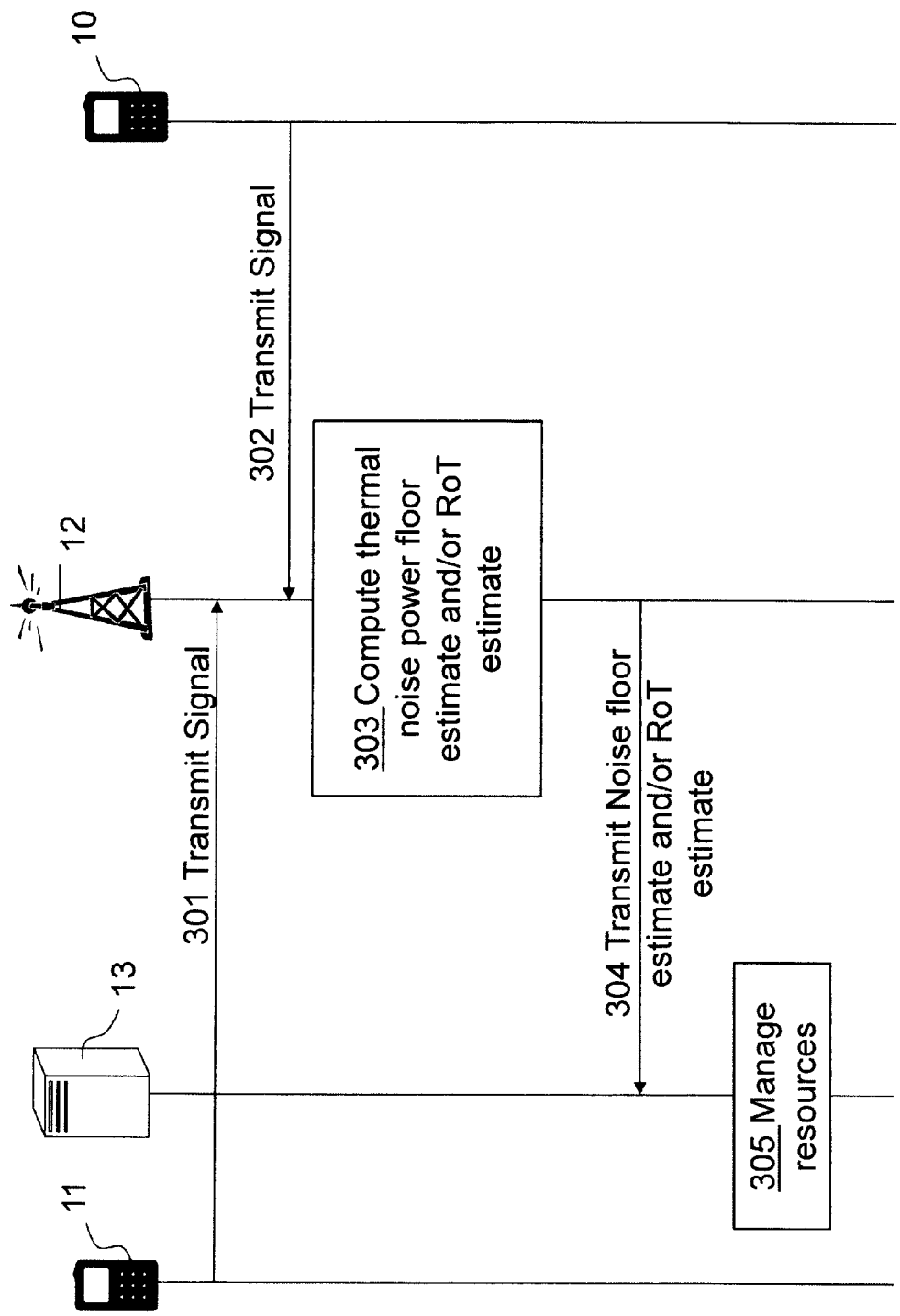
FIG. 3 is a combined flowchart and signaling scheme according to embodiments herein.

A combined signaling scheme and flowchart is disclosed in FIG. 3.

Action 301. The second or other user equipment 11 in the other cell transmits a signal that interferes with the radio base station 12.

Action 302. The (first) user equipment 10 transmits a signal to the radio base station 12.

Action 303. According to embodiments herein the radio base station 12 measures a received total power value $P_{RTWP}$ or RTWP at a receiver of the radio base station 12, also referred to as a received total wide band power, including a noise generated in the receiver, within a bandwidth defined by a receiver pulse shaping filter. Furthermore, the radio base station 12 estimates the thermal noise power floor level, $N_0(t)$, in the cell which may be used to determine rise over thermal (RoT)=RTWP/$N_0$. This will be explained in more detail below in FIGS. 4-11.

Action 304. The radio base station 12 may then transmit the estimated thermal noise floor power floor and/or an estimated RoT to the RNC 13.

Action 305. The RNC 13 may then use the received estimated thermal noise power floor and/or the estimated RoT when managing resources in the radio communications network. I.e. takes the estimated thermal noise power floor and/or the estimated RoT into account when scheduling resources or similar.

Noise Floor Estimation Algorithms

The noise power floor estimation algorithms to which embodiments herein may apply are described in detail in references [1]-[3] and WO2008041895. A summary is provided here.

Sliding Window Algorithm

Figure 4:
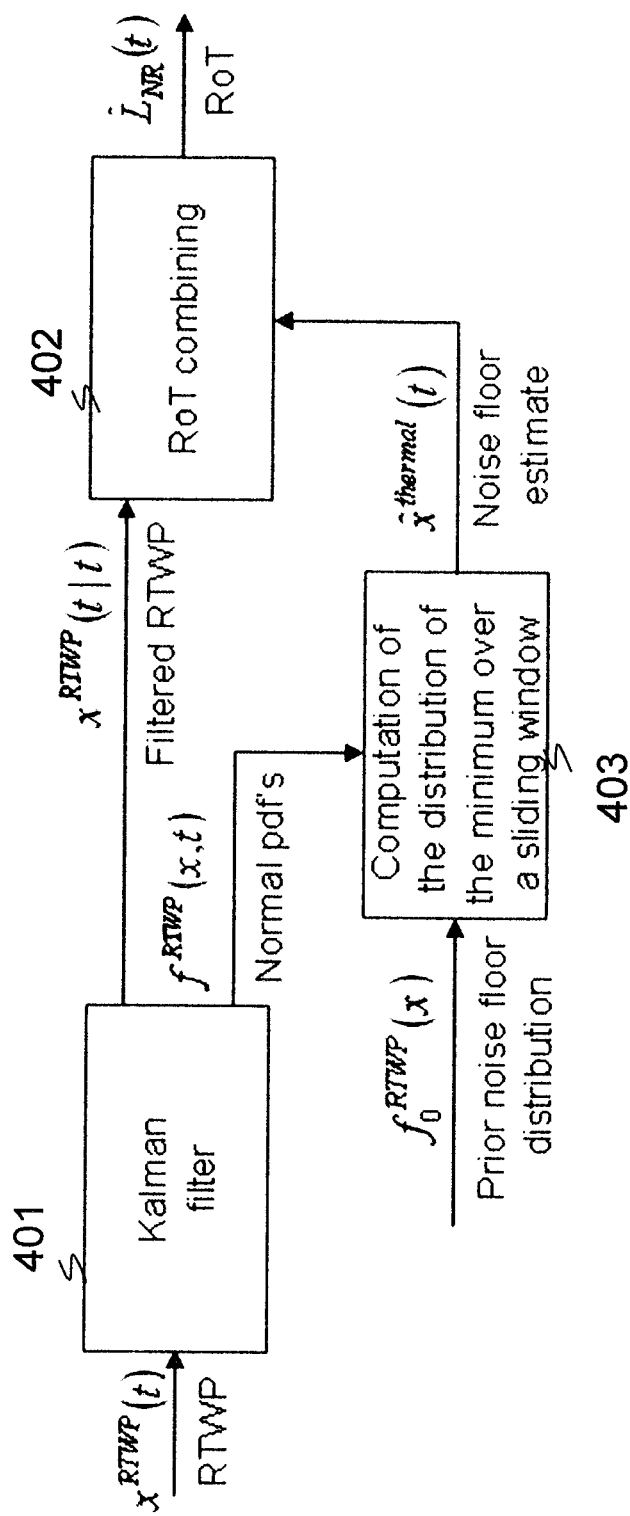
FIG. 4 is a block diagram of a RoT estimation algorithm.

The RoT estimation algorithm currently in use is depicted in FIG. 4. It is described in detail in [2]. The algorithm estimates the RoT, as given by eq. (1). The main problem solved by the estimation algorithm is the accurate estimation of the thermal noise power floor $x^{thermal}(t)$. Note that it is important to distinguish between the actual thermal noise power floor $N_0(t)$, and the estimate thereof $x^{thermal}(t)$. Since it is not possible to obtain exact estimates of this quantity due to the neighbor cell interference, as explained above, the estimator therefore applies an approximation, by consideration of the soft minimum as computed over a relative long window in time.

It is important to understand that this estimation relies on the fact that the thermal noise power floor is effectively constant over very long periods of time, disregarding the small temperature drift.

Recursive Algorithm

The sliding window algorithm of the above described estimation has the disadvantage of requiring a large amount of storage memory. This becomes particularly troublesome in case a large number of instances of the algorithm are needed.

To reduce the memory consumption a recursive algorithm was disclosed in [3] and in the patent application WO2008041895. That algorithm reduces the memory requirements of the sliding window scheme discussed above at least by a factor of 100-1000.

Input Power Scaling

The reference [3] recognizes a problem associated with power scaling of the output of a Kalman filter 401 of the RoT estimator, i.e. the first block of FIG. 4. Essentially the problem is due to the fact that the Kalman filter 401 is designed at a specific operating point in the linear power domain. Now, with recent traffic increases, the power operating point will vary significantly. Furthermore, the scaling problems become even more severe when in-band interference external to the WCDMA system is entered into the equation. This is because such interference, as explained above, affects the UL power level significantly.

Noting again that the Kalman filter 401 of FIG. 4 operates in the linear power domain, it follows that this Kalman filter 401 will necessarily be tuned for a specific power operating point close to the expected thermal noise power floor (in dBms). This means that the width of the support of the distributions, the "Gauss-curves", that are estimated remain invariant to large power level changes.

In case the actual measured power is far lower or far higher than the nominal operating point a reduced accuracy therefore results for the thermal noise power floor estimator, since estimation is performed on a discrete logarithmic power grid. The details on this prior art discretized estimation technique can be found in [3].

Figure 5:
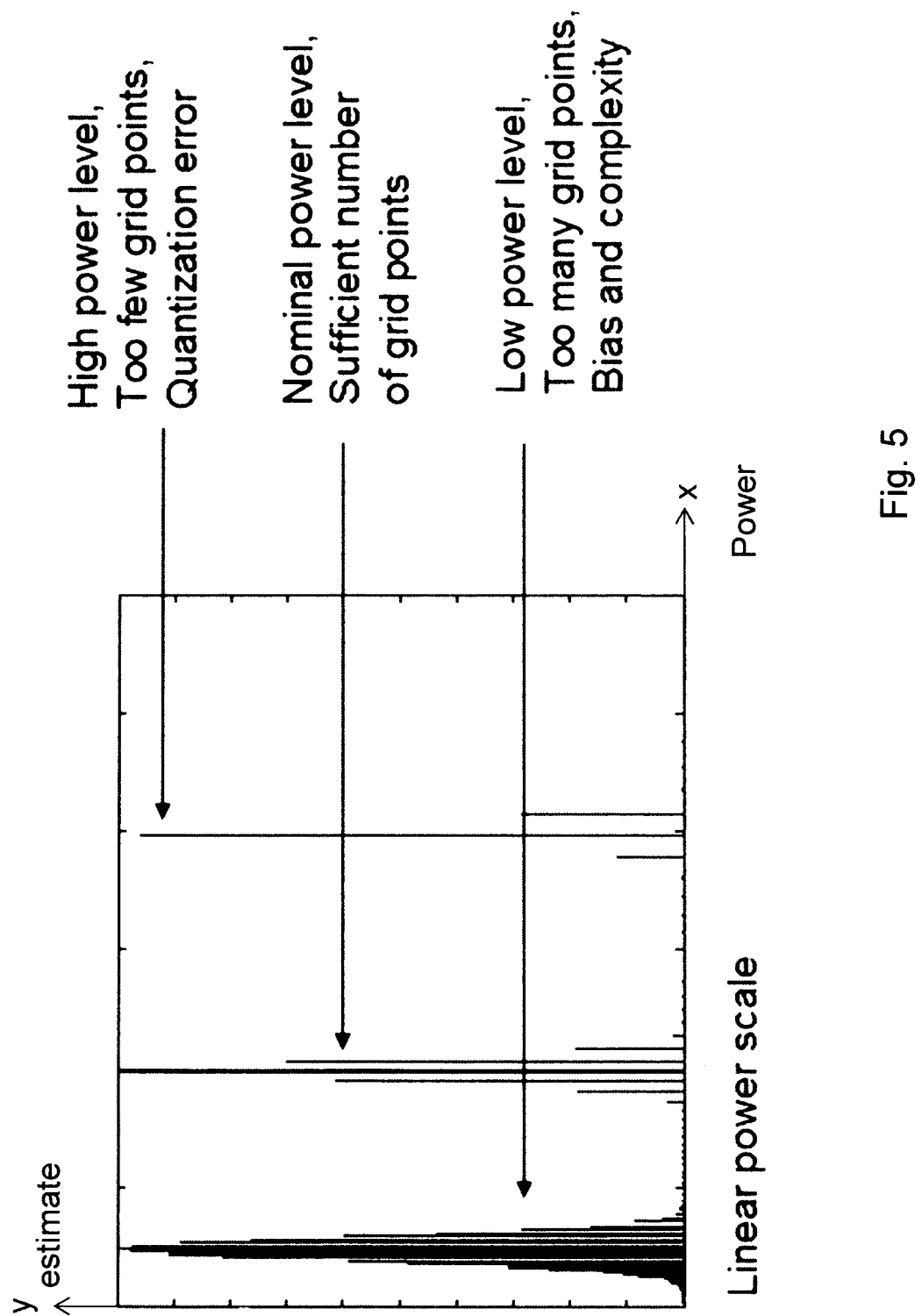
FIG. 5 shows a mismatch between the logarithmic power grid and the Kalman filter power estimates.

The power level dependency can be explained from FIG. 5, where it is shown that i) a reduced resolution results for powers significantly higher than the nominal thermal noise power floor, and ii) that bias results for powers significantly lower than the nominal thermal noise power floor, the latter being due to the fact that the density of grid points is higher for lower powers. Hence in both cases the accuracy is reduced. FIG. 5 illustrates a mismatch between the logarithmic power grid and the Kalman filter power estimates. It is shown that at high power level there are too few grid points that results in a quantization error. At a nominal power level there are sufficient number of grid points, and at a low power level there are too many grid points resulting in bias and complexity. Power is defined along an x-axis and estimate is defined along a y-axis.

In order to solve the above problems, a power scaling of the following Kalman filter 401 is introduced $$K_f(t)=P(t|t-T)C^T(t)(C(t)P(t|t-T)C^T(t)+R_2(t))^{-1}$$

$$\hat{x}(t|t)=\hat{x}(t|t-T)+K_f(t)(y(t)-C(t)\hat{x}(t|t-T))$$

$$P(t|t)=P(t|t-T)-K_f(t)C(t)P(t|t-T)$$

$$\hat{x}(t|t+T)=A\hat{x}(t|t)+Bu(t)$$

$$P(t+T|t)=AP(t|t)A^T+R_1(t). \qquad \text{eqs. (5)}$$

In eqs. (5), $\hat{x}(t|t-T)$ denotes the state prediction, based on data up to time $t-T$, $\hat{x}(t|t)$ denotes the filter update, based on data up to time $t$, $P(t|t-T)$ denotes the covariance of the state prediction, based on data up to time $t-T$, $P(t|t)$ denotes the covariance of the filter update, based on data up time $t$, and $K_f(t)$ denotes the time variable Kalman gain matrix. The quantities A, B, C(t), $R_1(t)$ and $R_2(t)$ are the system matrix, the input matrix, the measurement matrix, the systems noise covariance matrix and the measurement noise matrix, respectively. Their use and design are discussed in any standard textbook on Kalman filtering and are therefore not discussed further here.

The power scaling algorithm is based on the following result, proved in [3]:

"Assume that solutions $\hat{x}(t|t-T)$, $\hat{x}(t|t)$, $P(t|t-T)$, $P(t|t)$ are computed from eqs. (5) for $t>t_0$ using initial values $\hat{x}_0(t_0|t_0-T)$ and $P_0(t_0|t_0-T)$. Then, if eqs. (5) are rerun from $\hat{x}_0(t_0|t_0-T)$ and $P_0(t_0|t_0-T)$ using the scaled covariance matrices $R_1'(t)=v^2(t)R_1(t)$ and $R_2'(t)=v^2(t)R_2(t)$, the following results are obtained:

$$\hat{x}^v(t|t-T)=\hat{x}(t|t-T), t>t_0$$

$$\hat{x}^v(t|t)=\hat{x}(t|t), t>t_0$$

$$P^v(t|t-T)=v^2(t|t-T), t>t_0$$

$$P^v(t|t)=v^2(t)P(t|t), t>t_0$$

where the superscript $(\ )^v$ denotes the reiterated variables."

In order to exploit the above result, it is noted that a scaling with the scale factor $$v(t) = \frac{\bar{y}^{RTWP}(t)}{x_{Nominal}^{RTWP}},$$

where $x_{Nominal}^{RTWP}$ is the power value (of RTWP) in the linear domain for which the Kalman filter 401 is nominally tuned and where $\bar{y}^{RTWP}(t)$ is a time average of the RTWP, results in power estimates that are the same as without scaling, and power standard deviations that are scaled a factor $v(t)$. In particular this means that if the power level is increased a specific factor, then the probability distributions of the estimated powers spread out with the same factor. The consequence is that the number of grid points that cover the power probability distributions remains constant when the power level changes. The computation of $\bar{y}^{RTWP}(t)$ is performed by averaging in the logarithmic domain. The reason is that this gives similar rise and decay times for large power level changes.

For the above reasons, the power scaled Kalman 401 filter is selected as $$\bar{y}_{log}^{RTWP}=k_v\bar{y}_{log}^{RTWP}(t-T)+(1-k_v)(10^{10}\log(y^{RTWP}(t)))$$

$$v(t)=10^{(\bar{y}_{log}^{RTWP}(t)/10)}/x_{Nominal}^{RTWP}$$

$$K_f(t)=P(t|t-T)C^T(t)(C(t)P(t|t-T)C^T(t)+v^2(t)R_2(t))^{-1}$$

$$\hat{x}(t|t)=\hat{x}(t|t-T)+K_f(t)(y(t)-C(t)\hat{x}(t|t-T))$$

$$P(t|t)=P(t|t-T)-K_f(t)C(t)P(t|t-T)\hat{x}(t|t+T)=A\hat{x}(t|t)+Bu(t)$$

$$P(t+T|t)=AP(t|t)A^T+v^2(t)R_1(t). \qquad \text{eq. (6)}$$

Above, $k_v$ sets the bandwidth of the scale factor adaptation and $\bar{y}_{log}^{RTWP}(t)$ is the averaging filter state.

The preferred embodiment used in a RBS of today uses a variant of the above algorithm. The eqs. (5) are executed, followed by a scaling of the estimated covariance $P(t|t)$ with the scale factor $v(t)$.

Embodiments herein disclose two techniques for enhanced noise power floor estimation, also referred to as thermal noise power floor estimation or just noise floor estimation, to address the above mentioned main problems. The techniques are:

A post-processing noise floor estimation step, performing thermal noise power floor rate limitation. The Kalman filter 401 in the radio base station 12 estimates the rate of change of the estimated thermal noise power floor, followed by a limitation of the thermal noise power floor rate of change to be below a first pre-specified threshold. The rate limitation continues until the estimated thermal noise power floor falls below the noise floor as calculated according to the maximum allowed rate of change. To allow for instantaneous large reductions of the estimated thermal noise power floor, the limitation of the rate is only applied for increasing estimates of the thermal noise power floor.

A detection based instantaneous adjustment of the scaling power, in case of a large enough negative step of the estimated thermal noise power floor. The reduction of the estimated thermal noise power floor is measured at each update of the thermal noise power floor estimate. The measurement may be defined to be a specific level of the estimated cumulative distribution function of [1]-[3] and WO2008041895, typically the 1% level. The difference is computed as the difference between the current value and the value at the previous update step of the thermal noise power floor estimate. In case the negative thermal noise power floor step is less than a second pre-specified threshold or if change is bigger than a reduction threshold, at least one of the following actions is performed:

The estimated mean power level $\bar{y}^{RTWP}(t)$ is reduced with a quantity dependent on the measured reduction of the thermal noise power floor estimate, preferably by the same amount in dB. Note: This action is always performed.

The estimated probability density function of the thermal noise power floor, is re-initiated according to prior art techniques, but at the new level indicated by $\bar{y}^{RTWP}(t)$ rather than at the nominal prior level.

The estimated cumulative probability density function of the thermal noise power floor, is re-initiated according to prior art techniques, but at the new level indicated by $\bar{y}^{RTWP}(t)$ rather than at the nominal prior level.

Noise Power Floor Rate Limitation
Rate of Change Estimation

The rate of change of the estimated thermal noise power floor is performed with the Kalman filter 401. The Kalman filter 401 may comprise two states, a first state being the estimated rate of change of the estimated thermal noise power floor, a second state being the computed thermal noise power floor, conditioned on the estimated rate of change. The formal measurement signal may be obtained from any of the prior art estimators of the thermal noise power floor. The Kalman filter 401 may also require a dynamic model for the rate of change, the preferred embodiment utilizes a random walk assumption here. The quantities of the rate estimation part of the rate limitation algorithm are therefore, see eqs. (5) and the associated text, for explanation of the notation.

$$x(t) = \begin{pmatrix} x_1(t) \\ x_2(t) \end{pmatrix} \qquad \text{eq. (7)}$$

$$x(t+T) = \begin{pmatrix} 1 & 0 \\ 1 & T \end{pmatrix} x(t) + w(t) = Ax(t) + w(t) \qquad \text{eq. (8)}$$

$$E[w(t)w^T(t)] = R_1(t) \qquad \text{eq. (9)}$$

$$y(t) = (\,0 \quad 1\,)x(t) + e(t) = Cx(t) + e(t) \qquad \text{eq. (10)}$$

$$E[e^2(t)] = R_2(t). \qquad \text{eq. (11)}$$

Apart from what is defined in association with eqs. (5), here $x_1(t)$ is the rate of change of the estimated thermal noise floor estimate, $x_2(t)$ is the computed thermal noise power floor, given the estimated rate of change $x_1(t)$. Further y(t) is the output from any of the prior art algorithms of [1]-[3] and WO2008041895, for thermal noise power floor estimation, while T is the sampling period of the update of the thermal noise power floor estimate. Here, from the point of view of the rate estimation, the estimate of the thermal noise power floor is treated as a formal measurement. The rate estimation is now performed according to eqs. (5), which gives the estimate $\hat{x}(t|t)$ of the rate of change of thermal noise power floor.

Rate of Change Limitation

The next step of the algorithm compares the estimate $\hat{x}_1(t|t)$ to a first threshold $\alpha_1$. In case $\hat{x}_1(t|t) > \alpha_1$, the rate of change limitation is started, when the rate of change exceeds the threshold value. The thermal noise power floor estimate that are used for RoT computation and other tasks of the RBS 12 is then replaced by $$\hat{N}_{0,applied}(t) = \hat{N}_0(t_0) + \alpha_1(t-t_0). \qquad \text{eq. (12)}$$

Here, $\hat{N}_{0,applied}(t)$ is the applied optimal thermal noise power floor estimate at time t, $\hat{N}_0(t_0)$ is the estimate of the thermal noise power floor that was valid when rate limitation triggered, and $t_0$ is the time of trigger. The computation eq. (12) continues until the estimated thermal noise power floor becomes less than what is computed by eq. (12), then rate limitation is released.

Turning back to FIG. 4, the output, filtered RTWP, from the Kalman filter 401 is sent to a RoT combining block 402. The normal probability density functions (pdf) are sent to a computation block 403, which compute of the distribution of the minimum over a sliding window. The thermal noise power floor estimate from the computation block 403 is fed to the RoT combining block 402. The RoT combining block 402 essentially divides the filtered RTWP with the thermal noise power floor estimate.

Code

Some embodiments of the algorithm is given by the following MATLAB code.

Preferred Parameters

This piece of code sets pre-defined parameters. They are all explained in separate comments, each comment starting with a '%'.

```
%%%%%%%%%%%%%%%%%%%%%%%%%%%%%%%%%%%%%%%%%%%%%%%%%%%%%%
%
% Description: Script that sets the parameters of the noise floor rate
% limitation block of the algorithm
%
% Written by: Torbjörn Wigren, KI/EAB/FJW/SN
%
% Revision:   pA1    - First revision
%             pA2    - Moved control to main RoT estimation script
%             A -    Firm revision
%             B -    Invariance to the selected TTI, the selected sampling
%                    density
%                    and addition of a lower theoretical absolute level for
%                    the
%                    thermal noise power floor.
%
% Date: pA1 - 2007-12-13
%       pA2 - 2008-01-15
%       A - 2010-05-17
%       B - 2012-04-05
%
%%%%%%%%%%%%%%%%%%%%%%%%%%%%%%%%%%%%%%%%%%%%%%%%%%%%%%
```

```
%%%%%%%%%%%%%%%%%%%%%%%%%%%%%
% Limitation parameters
%%%%%%%%%%%%%%%%%%%%%%%%%%%%%
noiseFloorRateTrigger=0; % Trigger flag [dimensionless]
noiseFloorUpdateStepsBackward=2; % size of FIFO for storage of latest
                           values of the estimated noise floor [dimensionless].
                           Candidate for hardcoding.
maxFloorIncrease=0.20; % Maximum allowed estimated noise drift rate
                                            [dB/h]
lowestAllowedNoiseFloorDb=-109.0; % Works even with Antarctic
                                    temperatures (kTB) [dBm]
%%%%%%%%%%%%%%%%%%%%%%%%%%%%%%%%%%%%%%%%%%%%%%%%%%
% Rate estimation parameters (performed by a Kalman differentiating
%                          filter, % sampled from a 0 acceleration model in
%                          continuous time)
%%%%%%%%%%%%%%%%%%%%%%%%%%%%%%%%%%%%%%%%%%%%%%%%%%
initialNoiseFloorRateEstimatedDb=0; % Initial state estimate –
                          noise floor rate [dB/h]. Candidate for hardcoding.
initialNoiseFloorRateEstimatedVarianceDb=(sqrt(10.0))^2; % Initial
                          state covariance element – noise floor rate
                          variance [(dB/h)^2)]. Candidate for hardcoding.
initialNoiseFloorEstimatedDb=eulThermalLevelPrior; % Initial state
                          estimate – noise floor [dBm]. Candidate for hardcoding.
initialNoiseFloorEstimatedVarianceDb=(sqrt(100))^2; % Initial state
                          covariance element – noise floor variance [(dB)^2].
                          Candidate for hardcoding.
noiseFloorEstimationErrorVarianceDb=3^2; % "Measurement" error
                          covariance - really the estimation error variance
        in the logarithmic domain [(dB)^2/h]. Candidate for hardcoding.
noiseFloorRateVarianceDb=(sqrt(0.1))^2; % Systems noise covariance,
                          noise floor rate element [(dB/h)^2)/h].
noiseFloorVarianceDb=(sqrt(0.01))^2; % Systems noise, noise floor
                                    variance – [(dB)^2/h].
```

Initialization

This script sets up and initializes vector variables that are related to the some embodiments mentioned herein. Recalculations of parameters also take place. They are explained in comments.

```
%%%%%%%%%%%%%%%%%%%%%%%%%%%%%%%%%%%%%%%%%%%%%%%%%%
%
% Description: Script that initializes the noise floor rate limitation
% block of the algorithm
%
% Written by: Torbjörn Wigren, KI/EAB/FJW/SN
%
% Revision:  pA1   - First version
%            A -   First version of the Kalman filter based noise floor
%                  limitation
%            B -   Invariance to the selected TTI, the selected sampling
%                  density
%                  and addition of a lower theoretical absolute level for
%                  the thermal noise power floor.
%
% Date:  pA1 - 2007-12-13
%        A - 2010-05-17
%        B - 2012-04-05
%%%%%%%%%%%%%%%%%%%%%%%%%%%%%%%%%%%%%%%%%%%%%%%%%%
%%%%%%%%%%%%%%%%%%%%%%%%%%%%%%%
% Parameter transformations and re-definitions
%%%%%%%%%%%%%%%%%%%%%%%%%%%%%%%
timeOldRot=2*eulPowerSamplingSpacing; % The hold time during which
               eulThermalLevelPrior is held after algorithm start [s].
noiseFloorRateLimit=maxFloorIncrease/3600; % Transformation to SI units
                                            [dB/s]
lowestAllowedNoiseFloor=10^(-3)*10^(lowestAllowedNoiseFloorDb/10); %
                                    Transformation to SI units [W]
r2RateLimitation=noiseFloorEstimationErrorVarianceDb/3600; %
                          "Measurement" error covariance - really
                          the estimation error variance in the
                          logarithmic domain [(dB)^2/s]
r111RateLimitation=noiseFloorRateVarianceDb/(3600^3); % Systems noise
                          covariance, noise floor rate element.
```

```
                                                Transformation to SI units [(dB/s)^2/s]
r122RateLimitation=noiseFloorVarianceDb/3600; % Systems noise
                                                covariance, noise floor element.
                                                Transformation to SI units [(dB)^2/s]
%%%%%%%%%%%%%%%%%%%%%%%%%%%%%%%%%%%%%%%%%%%%%%%%%%%%%%%%
% Initialization variables and corresponding parameter transformations
%%%%%%%%%%%%%%%%%%%%%%%%%%%%%%%%%%%%%%%%%%%%%%%%%%%%%%%%
x0NoiseFloorRateDb=initialNoiseFloorRateEstimatedDb/3600; % Initial
                                                state estimate, noise floor rate.
                                                Transformation to SI units [dB/s]
x0NoiseFloorDb=initialNoiseFloorEstimatedDb; % Initial state estimate,
                                                noise floor level. Transformation to SI units
                                                                                        [dBm]
p0NoiseFloorRateDb=initialNoiseFloorRateEstimatedVarianceDb*(1/3600)^2;
% Initial state covariance element, noise floor rate. Transformation
    to SI units [(dB/s)^2]
p0NoiseFloorDb=initialNoiseFloorEstimatedVarianceDb; % Initial state
                                                covariance element, noise floor.
                                                Transformation to SI units [(dB)^2]
appliedOptimalNoiseFloorFifoDb=zeros(noiseFloorUpdateStepsBackward,1)+e
ulThermalLevelPrior; % Initiation of the FIFO for storage of the latest
                                                values of the estimated noise floor [dimensionless]
%%%%%%%%%%%%%%%%%%%
% Initialization
%%%%%%%%%%%%%%%%%%%
xNoiseFloorRatePredictionDb=x0NoiseFloorRateDb; % State initialization
xNoiseFloorPredictionDb=x0NoiseFloorDb; % State initialization
pNoiseFloorRateVariancePredictionDb=p0NoiseFloorRateDb; % State
                                                covariance initialization
pNoiseFloorVariancePredictionDb=p0NoiseFloorDb; % State covariance
                                                initialization
pNoiseFloorCouplingPredictionDb=0; % State covariance intialization
appliedOptimalNoiseFloorEstimate = 10^((eulThermalLevelPrior−30)/10); %
                                                Need to be initialized for derivation of
                                                the neighbor cell interference the first samples
xNoiseFloorRateUpdateDb = 0.0; % Needed for first pass of bias
                                                estimation
noiseFloorWhenTriggeredDb = eulThermalLevelPrior; % Needed for first
                                                pass of bias estimation
```

Algorithm

This code iterates the Kalman filter 401 for rate limitation one time step. The operation is explained with comments.

```
%%%%%%%%%%%%%%%%%%%%%%%%%%%%%%%%%%%%%%%%%%%%%%%%%%
%
% Description: Script that implements the recursive noise floor rate
% limitation algorithm of the overall RoT estimation algorithm
%
% Written by: Torbjörn Wigren, KI/EAB/FJW/SN
%
% Revision:     pA1     - First revision
%               pA2     - Moved control switch to main RoT estimation script
%               A -     Firm revision
%               B -     Invariance to the selected TTI, the selected sampling
%                       period and addition of a lower theoretical absolute
%                       level for the
%                       thermal noise power floor.
%               C -     Introduced selectable tabulated computation of 10^( ),
%                       10*log( ) and sqrt( ), exploiting linear interpolation.
%                       256-512 table entries seem to avoid impairments, while the
%                       impairments remain small with 64 entries.
%
% Date: pA1     - 2007-12-17
%       pA2     - 2008-01-15
%       A -     2010-05-17
%       B -     2012-04-05
%       C -     2012-04-13
%
%%%%%%%%%%%%%%%%%%%%%%%%%%%%%%%%%%%%%%%%%%%%%%%%%%
if t>timeOldRot
%%%%%%%%%%%%%%%%%%%%%%%%%%%%%%%%%%%%%%%%%%%%%%%%%%
% Estimate new rate of thermal noise power floor - one Kalman filter
% iteration
%%%%%%%%%%%%%%%%%%%%%%%%%%%%%%%%%%%%%%%%%%%%%%%%%%
```

```
noiseFloorVariancePredictionDenominatorDb=pNoiseFloorVariancePrediction
Db+r2RateLimitation; % Quantity repeatedly used in recursions below
kalmanGainNoiseFloorRateDb=pNoiseFloorCouplingPredictionDb/noiseFloor
VariancePredictionDenominatorDb; % Kalman gain for noise floor rate
                                      update
kalmanGainNoiseFloorDb=pNoiseFloorVariancePredictionDb/noiseFloorVariance
PredictionDenominatorDb; % Kalman gain for noise floor update
xNoiseFloorRateUpdateDb=xNoiseFloorRatePredictionDb+kalmanGainNoiseFloor
RateDb*(estimatedOptimalNoiseFloorDb−xNoiseFloorPredictionDb); % Noise
                  floor rate state estimate update (filtered)
xNoiseFloorUpdateDb=xNoiseFloorPredictionDb+kalmanGainNoiseFloorDb*
(estimatedOptimalNoiseFloorDb−xNoiseFloorPredictionDb); % Noise floor state
                            estimate update (filtered)
     newXNoiseFloorRatePredictionDb=xNoiseFloorRateUpdateDb; % Noise
                       floor rate state prediction
newXNoiseFloorPredictionDb=xNoiseFloorUpdateDb+eulPowerSamplingSpacing*
xNoiseFloorRateUpdateDb; % Noise floor state prediction
newPNoiseFloorRateVariancePredictionDb=pNoiseFloorRateVariancePrediction
Db−
pNoiseFloorCouplingPredictionDb*pNoiseFloorCouplingPredictionDb/noise
FloorVariancePredictionDenominatorDb+r111RateLimitation*eulPowerSampling
Spacing; % Noise floor rate state covariance prediction
newPNoiseFloorCouplingPredictionDb=eulPowerSamplingSpacing*(pNoiseFloor
RateVariancePredictionDb−
pNoiseFloorCouplingPredictionDb*pNoiseFloorCouplingPredictionDb/noiseFloor
VariancePredictionDenominatorDb)+pNoiseFloorCouplingPredictionDb*r2R
ateLimitation/noiseFloorVariancePredictionDenominatorDb+r111RateLimitation*
eulPowerSamplingSpacing*eulPowerSamplingSpacing/2; % Noise floor
                  rate/noise floor coupling state covariance prediction
newPNoiseFloorVariancePredictionDb=eulPowerSamplingSpacing*eulPower
SamplingSpacing*(pNoiseFloorRateVariancePredictionDb−
pNoiseFloorCouplingPredictionDb*pNoiseFloorCouplingPredictionDb/noise
FloorVariancePredictionDenominatorDb)+2*eulPowerSamplingSpacing*pNoise
FloorCouplingPredictionDb*r2RateLimitation/noiseFloorVariancePrediction
DenominatorDb+pNoiseFloorVariancePredictionDb*r2RateLimitation/noiseFloor
VariancePredictionDenominatorDb+r111RateLimitation*eulPowerSamplingSpacing*
eulPowerSamplingSpacing*eulPowerSamplingSpacing/3+r122RateLimitation*
eulPowerSamplingSpacing; % Noise floor state covariance prediction
     xNoiseFloorRatePredictionDb=newXNoiseFloorRatePredictionDb; % Step
          noise floor rate state estimate eulPowerSamplingSpacing seconds
     xNoiseFloorPredictionDb=newXNoiseFloorPredictionDb; % Step noise
                  floor state estimate eulPowerSamplingSpacing seconds
pNoiseFloorRateVariancePredictionDb=newPNoiseFloorRateVariancePredictionDb;
% Step noise floor rate state covariance estimate
                             eulPowerSamplingSpacing seconds
     pNoiseFloorCouplingPredictionDb=newPNoiseFloorCouplingPredictionDb;
% Step noise floor rate/noise floor coupling state covariance estimate
eulPowerSamplingSpacing seconds
     pNoiseFloorVariancePredictionDb=newPNoiseFloorVariancePredictionDb;
% Step noise floor state covariance estimate eulPowerSamplingSpacing
seconds
%%%%%%%%%%%%%%%%%%%%%%%%%%%%%
% Check and update limitation
%%%%%%%%%%%%%%%%%%%%%%%%%%%%%
     if (noiseFloorRateTrigger==0)
          if (xNoiseFloorRateUpdateDb>noiseFloorRateLimit) % No downward
                            limitation − rate based triggering
               noiseFloorRateTrigger=1; % Indicate trigger
               timeWhenTriggered=t-
noiseFloorUpdateStepsBackward*eulPowerSamplingSpacing; % Step back in
                                      time
noiseFloorWhenTriggeredDb=appliedOptimalNoiseFloorFifoDb(noiseFloorUpdate
StepsBackward,1); % Get backstepped stored noise floor
appliedOptimalNoiseFloorEstimateDb=noiseFloorWhenTriggeredDb+
(t-timeWhenTriggered)*noiseFloorRateLimit; % Added Compute output
               else
appliedOptimalNoiseFloorEstimateDb=estimatedOptimalNoiseFloorDb;
               end
     else
          thisNoiseFloorLimitDb=noiseFloorWhenTriggeredDb+
(t-timeWhenTriggered)*noiseFloorRateLimit;
          if (estimatedOptimalNoiseFloorDb>thisNoiseFloorLimitDb) % If
still triggered (now based on linear prediction) - continue to output
limited noise floor
```

-continued

```
            appliedOptimalNoiseFloorEstimateDb=thisNoiseFloorLimitDb;
        else
            noiseFloorRateTrigger=0;
appliedOptimalNoiseFloorEstimateDb=estimatedOptimalNoiseFloorDb;
        end
    end
%%%%%%%%%%%%%%%
% Update FIFO
%%%%%%%%%%%%%%%
    for i=1:noiseFloorUpdateStepsBackward−1
appliedOptimalNoiseFloorFifoDb(i+1,1)=appliedOptimalNoiseFloorFifoDb(i,
1);
    end
appliedOptimalNoiseFloorFifoDb(1)=appliedOptimalNoiseFloorEstimateDb;
    %%%%%%%%%%%%%%%%%%%%%%%%%%%%%%%%%%%%%%%%%%
    % Transform and output appliedOptimalNoiseFloorEstimate
    %%%%%%%%%%%%%%%%%%%%%%%%%%%%%%%%%%%%%%%%%%
    if (powTableEnabled==0)
        appliedOptimalNoiseFloorEstimate=(1e−3)*
10^(appliedOptimalNoiseFloorEstimateDb/10);
    else
appliedOptimalNoiseFloorEstimate=0.001*powTab(appliedOptimalNoiseFloor
EstimateDb);
    end
else % timeOldRot has not passed
    xNoiseFloorRateUpdateDb=xNoiseFloorRatePredictionDb; % For plotting
    xNoiseFloorUpdateDb=xNoiseFloorPredictionDb; % For plotting
    if (powTableEnabled==0)
        appliedOptimalNoiseFloorEstimate=(1e−3)*
10^(eulThermalLevelPrior/10); % Hold initial value
    else
appliedOptimalNoiseFloorEstimate=0.001*powTab(eulThermalLevelPrior); %
Hold initial value
    end
end
%%%%%%%%%%%%%%%%%%%%%%%%%%%%%%%%%%%%%%%%%%%%%%
% Limit appliedOptimalNoiseFloor to be above a minimal power limit
%%%%%%%%%%%%%%%%%%%%%%%%%%%%%%%%%%%%%%%%%%%%%%
if (appliedOptimalNoiseFloorEstimate < lowestAllowedNoiseFloor)
    appliedOptimalNoiseFloorEstimate = lowestAllowedNoiseFloor;
end
```

Improved Noise Power Floor Performance at Large Negative Steps

Step Size Detection

The detection of a large negative step of the estimated thermal noise power floor is based on measurements on a related quantity, namely the reversed cumulative probability density function of the thermal noise power floor. This function is checked before computation of the thermal noise power floor estimate, to avoid a more complex re-calculation of the thermal noise power floor estimate.

Figure 6:
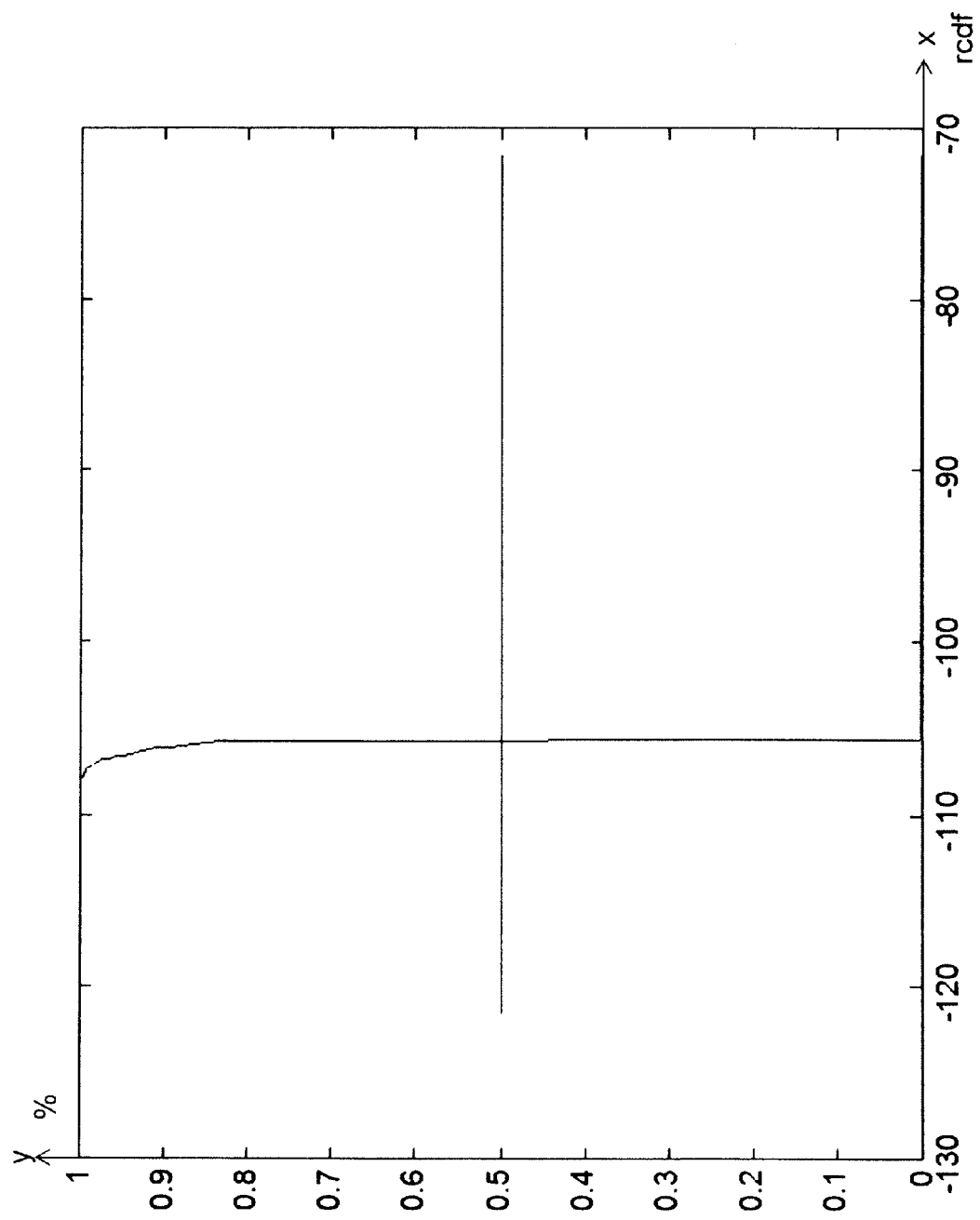
FIG. 6 is a graph depicting a reversed cumulative probability density function.

The calculation is performed by registering a certain level ($\lambda$) value of this reversed cumulative probability density function, denoted $rcdf_\lambda(t)$. The procedure is illustrated in FIG. 6, using the level 50%. The use of 50% is for readability of the FIG. 6, the preferred value is of the order of 1%. Percentage is defined along a y-axis and function value is defined along an x-axis. FIG. 6 illustrates the measuring the 50% level of the reversed cumulative probability density function, associated with the thermal noise power floor estimate. $rcdf_\lambda(t)$ is plotted being the almost vertical line, and the 50% level is the horizontal line, see also the FIG. 6 where the quantities are marked.

Two consecutive values are then subtracted and in case $$rcdf_\lambda(t)-rcdf_\lambda(t-T)<\alpha_2, \qquad \text{eq. (13)}$$

where $\alpha_2$ is the second threshold, one or more actions defined in the section below are initiated.

Actions

A first action, also see Action 1205 below, corresponds to a momentary change of the estimated power level used for scaling in eq. (6), as defined by $$\bar{y}_{log}^{RTWP}(t):=\bar{y}_{log}^{RTWP}(t)+rcdf_\lambda(t)-rcdf_\lambda(t-T). \qquad \text{eq. (14)}$$

Note that eq. (14) may always be performed. Equation (14) shows a preferred embodiment where the power reduction equals the negative step, this exact correspondence is however not a necessity, it is enough that the modification of $\bar{y}^{RTWP}(t)$ is dependent on $rcdf_\lambda(t)-rcdf_\lambda(t-T)$.

A second action, also see Action 1206 below, re-sets or re-initiates the running estimate of the probability density function of the thermal noise power floor (more precisely, the probability density function of the minimum of the measured RTWP). In a preferred embodiment the probability density function resembles the prior probability distribution of the thermal noise power floor estimate, but with a peak close to the value of eq. (14).

A third action, also see Action 1207 below, performs a numerical integration of the re-set probability density function of the minimum of the measured RTWP, followed by a change of sign and an addition of 1, to arrive at a consistent and new so called reversed cumulative probability distribution function of the thermal noise power floor.

Code

Parameters

```
%%%%%%%%%%%%%%%%%%%%%%%%%%%%%%%%%%%%%%%
%
% Description: Script that sets the parameters used in the
% re-initialization of the recursive Bayesian noise floor estimation
algorithm.
%
% Written by: Torbjörn Wigren, KI/EAB/FJW/SN
%
% Revision: A - First firm version
%
% Date: A - 2012-05-14
%
%%%%%%%%%%%%%%%%%%%%%%%%%%%%%%%%%%%%%%%
%%%%%%%%%%%%%%%
% Parameters
%%%%%%%%%%%%%%%
reInitiatedPowerPdfSigma = 1.5; % The spread of the pdf to which re-
    initialization is performed
reInitiatedPowerPdfFloor = 0.99*1e-6; % The floor of the pdf to
    which re-initialization is performed
```

Initialization of the Re-Initialization Function

```
%%%%%%%%%%%%%%%%%%%%%%%%%%%%%%%%%%%%%%%
%
% Description: Script that initializes the variables used in the
% re-initialization of the recursive Bayesian noise floor estimation
algorithm.
%
% Written by: Torbjörn Wigren, KI/EAB/FJW/SN
%
% Revision: A - First firm version
%
% Date: A - 2012-05-13
%
%%%%%%%%%%%%%%%%%%%%%%%%%%%%%%%%%%%%%%%
%%%%%%%%%%%%%%%%%%%
% Initialization
%%%%%%%%%%%%%%%%%%%
unnormalizedReInitiatedPowerPdf=zeros(1,powerGridSize); % pdf of re-
    initialized prior power pdf
reInitiatedPowerPdf=zeros(1,powerGridSize); % pdf of re-initialized
    prior pdf - normalized
reInitiatedPowerCdf=zeros(1,powerGridSize); % cdf of re-initialized
    prior pdf - normalized
reInitiatedRevPowerCdf=zeros(1,powerGridSize); % Reverted cdf of re-
    initialized prior pdf - normalized
```

Detection of Large Negative Step

This piece of code is extracted from an implementation of the algorithm of [3].

```
%%%%%%%%%%%%%%%%%%%%%%%%%%%%%%%%%%%%%%%
% Special handling of large negative steps that need to be momentary
%%%%%%%%%%%%%%%%%%%%%%%%%%%%%%%%%%%%%%%
if (fastPowerReductionAdaptationEnabled == 1)
    thisHighestNonzeroCdfPowerIndex = powerGridSize-1; % Find
        maxpower (where CDF is above
        fractionalDistributionFloor)
    while
((gammaCdf(1,thisHighestNonzeroCdfPowerIndex+1)<=CdfReduction
TriggerLevel) & (thisHighestNonzeroCdfPowerIndex>0))
        thisHighestNonzeroCdfPowerIndex =
thisHighestNonzeroCdfPowerIndex-1;
    end
    thisHighestNonzeroCdfPowerdBm =
logarithmicPowerGrid(1, thisHighestNonzeroCdfPowerIndex);
    powerReductionStepdB = thisHighestNonzeroCdfPowerdBm-
lastHighestNonzeroCdfPowerdBm; % Check if there is a sufficiently
largenegative change since last update
    if (powerReductionStepdB < CdfReductionThresholddB)
        reInitializeRecursiveNoiseFloor; % Reinitialize the noise
powerfloor estimation at new power level
    end
    lastHighestNonzeroCdfPowerdBm = thisHighestNonzeroCdfPow-
        erdBm;
end
```

Actions

```
%%%%%%%%%%%%%%%%%%%%%%%%%%%%%%%%%%%%%%%
%
% Description: Script that re-initialized the estimate min power pdf
and
% corresponding CDF in case of a large negative step.
%
% Written by: Torbjörn Wigren, KI/EAB/FJW/SNU
%
% Revision:    A - First revision
%              B - Introduced coarse tabulation for exp( ) computation
%
% Date:    A -    2012-05-13
%         B -    2012-05-14
%
%%%%%%%%%%%%%%%%%%%%%%%%%%%%%%%%%%%%%%%
meanPowerLevel = meanPowerLevel+powerReductionStepdB; %
Reduce mean power, that is controlling uncertainty
reInitiatedEulThermalPowerLevel = meanPowerLevel;
if (reInitiatedEulThermalPowerLevel < eulThermalLevelPrior)
    reInitiatedEulThermalPowerLevel = eulThermalLevelPrior;
end
if (expTableEnabled==1)
    for j=0:powerGridSize-1 % Computation of the re-initiated pdf of
the noise floor power (computed on the power grid). Computation uses
coarse exp( )table
unnormalizedReInitiatedPowerPdf(1,j+1)=(0.3989/(reInitiatedPower-
PdfSigma))*expTab(-(logarithmicPowerGrid(1,j+1)-
reInitiatedEulThermalPowerLevel)*(logarithmicPowerGrid(1,j+1)-
reInitiatedEulThermalPowerLevel)/(2*(reInitiatedPowerPdfSigma*
reInitiatedPowerPdfSigma)))+reInitiatedPowerPdfFloor;
    end
else
    for j=0:powerGridSize-1 % Computation of the re-initiated pdf of
the noise floor power (computed on the power grid)
unnormalizedReInitiatedPowerPdf(1,j+1)=(1/(sqrt(2*pi)*reInitiated
PowerPdfSigma))*exp(-(logarithmicPowerGrid(1,j+1)-
reInitiatedEulThermalPowerLevel)*(logarithmicPowerGrid(1,j+1)-
reInitiatedEulThermalPowerLevel)/(2*(reInitiatedPowerPdf Sigma*
reInitiatedPowerPdfSigma)))+reInitiatedPowerPdfFloor;
    end
end
reInitiatedNormalization=0.0;
for j=0:powerGridSize-2% Computation of normalization factor of the
re-initiated pdf of the noise floor power - exploiting numerical
intgration to get an integral value of 1
reInitiatedNormalization=reInitiatedNormalization+unnormalizedRe
InitiatedPowerPdf(1,j+1)*(powerGrid(1,j+2)-powerGrid(1,j+1));
end
reInitiatedNormalization=1/reInitiatedNormalization;
for j=0:powerGridSize-1 % Normalization
reInitiatedPowerPdf(1,j+1)=unnormalizedReInitiatedPowerPdf(1,j+1)*
reInitiatedNormalization; % Better to multiply than divide
end
reInitiatedPowerCdf(1,1)=0.0;
for j=1:powerGridSize-1 % Integrate the re-initiated power pdf to get a
consistent re-initiated power CDF
reInitiatedPowerCdf (1,j+1) =reInitiatedPowerCdf(1,j)+reInitiatedPower
(1,j+1)*(powerGrid(1,j+1)-powerGrid(1,j));
    PdfreInitiatedRevPowerCdf(1,j+1)=1-reInitiatedPowerCdf(1,j+1);
end
for j=0:powerGridSize-1
    gammaCdf(1,j+1)=reInitiatedRevPowerCdf(1,j+1); % The CDF
corrsponding to reInitiatedPowerPdf
```

-continued

```
    fMinPdf(1,j+1)=reInitiatedPowerPdf(1,j+1); % The sought pdf of
        the
minimum of the power received from the Kalman filter block
[dimensionless]
        minNormalization = 1.0; % Need to reset the normalization, used
during normal estimation
end
```

According to some embodiments herein a method in the radio base station 12 is disclosed. The radio base station 12 determines a change or a rate of change of the thermal noise power floor estimate. The radio base station 12 then compares the change or the rate of change to a threshold. Whether the rate of change or change value exceeds or goes below the threshold, depending whether the threshold is a lower limit or an upper limit, the radio base station 12 may perform at least one of the following:

- set a limitation of the rate of change, i.e. the thermal noise power floor estimate cannot exceed a certain value relative a previous thermal noise power floor estimate. The rate limitation continues until the estimated thermal noise power floor falls below the thermal noise power floor estimate as calculated according to the limitation also referred to as a maximum allowed rate of change; and/or
- an estimated mean power level $\bar{y}^{RTWP}(t)$ is reduced with a quantity dependent on the measured reduction of the thermal noise power floor estimate, and/or
- re-initiate a probability density function of the thermal noise power floor with a start value based on the estimated mean power level $\bar{y}^{RTWP}(t)$, and/or
- re-initiate a cumulative probability density function of the thermal noise power floor with a start value based on the estimated mean power level $\bar{y}^{RTWP}(t)$, and/or
- set a power scale value that is reduced.

Some embodiments herein relate to a radio base station comprising a determining/processing circuit configured to perform the actions described herein.

Apparatus

Figure 7:
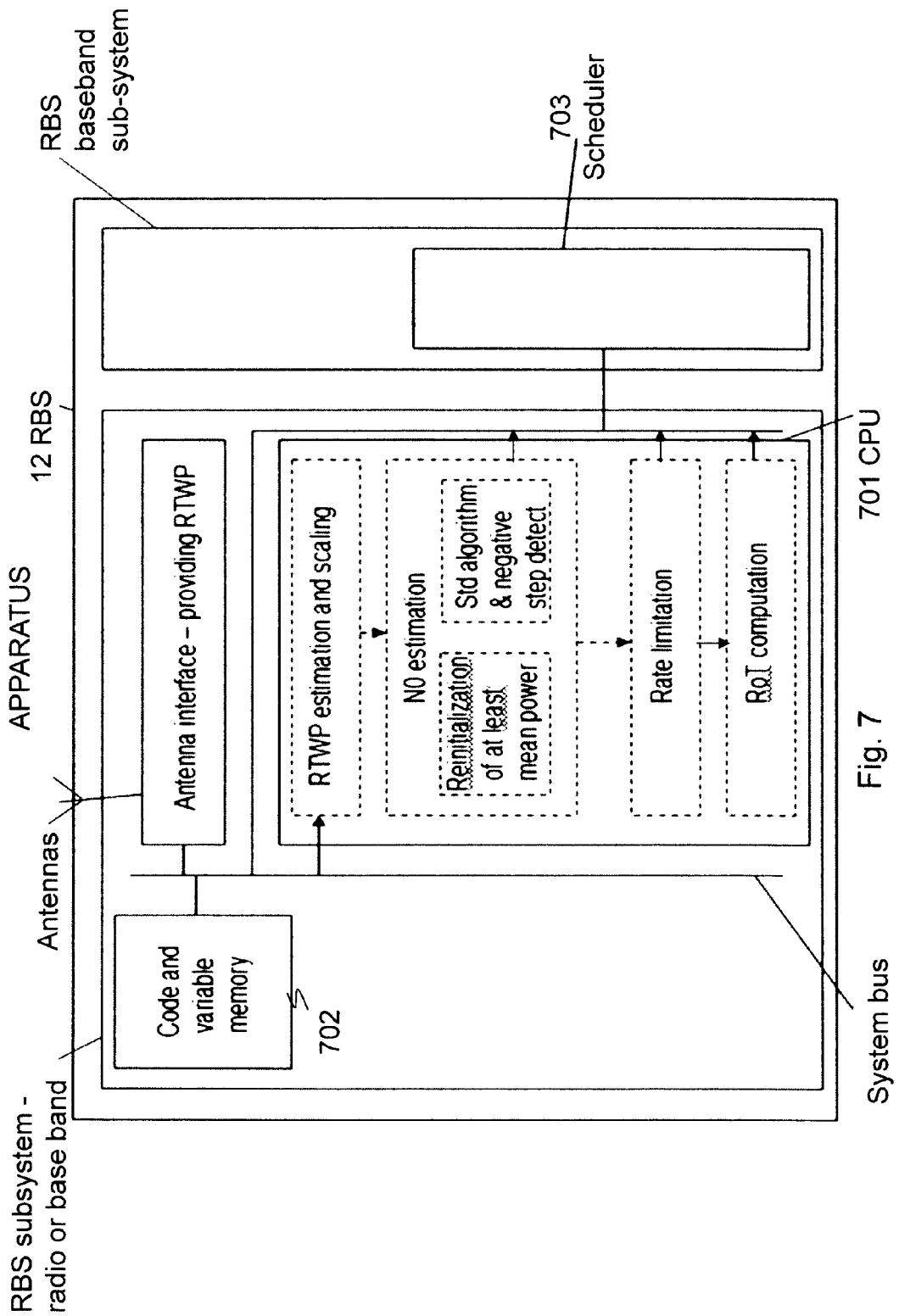
FIG. 7 is a schematic overview depicting an apparatus according to some embodiments herein.
Figure 13:
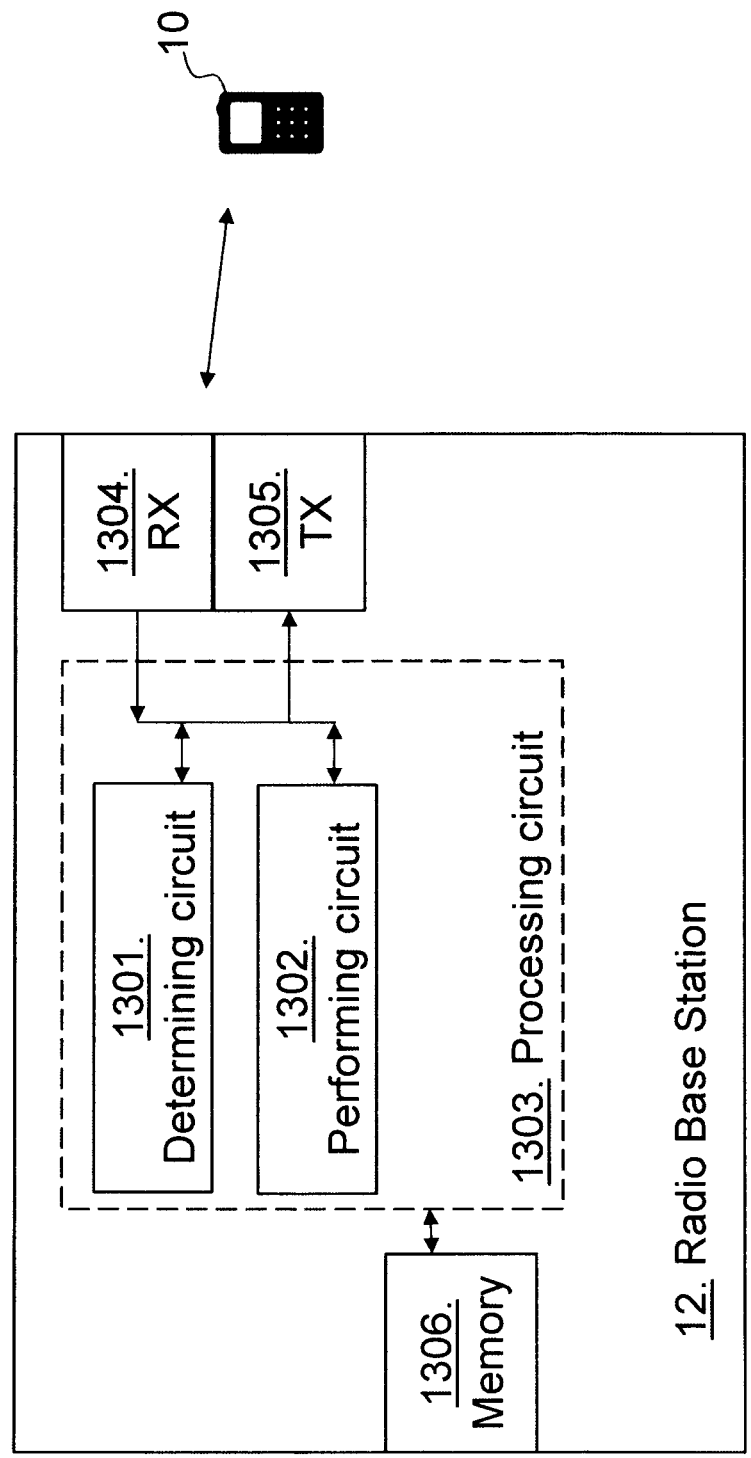
FIG. 13 is a block diagram depicting a radio base station according to embodiments herein.

FIG. 7 is a schematic block diagram depicting embodiments of the radio base station 12, embodiments of the radio base station 12 are also illustrated in FIG. 13 below. The apparatus of embodiments herein may comprise a computer, comprising a central processing unit (CPU) 701, and a memory 702 comprising a memory for storage of fix tables, other memory for storage of dynamically computed tables, as well as a memory for storage of computer code and variables used by such code. The computer may be of general purpose type, or a digital signal processor (DSP), or a computer implemented in dedicated hardware like a field programmable gate array (FPGA) or an application specific integrated circuit (ASIC).

Some embodiments are preferably implemented in terms of computer code and tables that execute instructions according to the embodiments herein. The apparatus of the embodiments is either located in the radio sub-system of the RBS 12 or in the base band subsystem of the RBS.

Some embodiments are also equipped with an input interface, such as an antenna interface, over which RTWP measurements are received. An output interface may also be included, over which compensated estimates of the thermal noise power floor and of the rise over thermal is delivered. The interfaces are internal to the RBS 12. The embodiments herein for estimating thermal noise power floor may be implemented through one or more processors, such as a processing circuit, e.g. CPU 701 in the radio base station 12 depicted in FIG. 7, together with computer program code for performing the functions and/or method steps of the embodiments herein. The CPU 701 may be configured to perform RTWP estimation and scaling. Furthermore, Thermal Noise power floor estimation, also referred to as Noise floor estimation, may also be performed. This may comprise re-initialization of mean power or standard algorithm and also wherein a negative step is detected. The CPU 701 may be configured to initiate a rate limitation based on the thermal noise power floor estimate or a reduction of the estimate mean power is reduced. The output may be fed to a scheduler 703 of the radio base station 12.

The program code mentioned above may also be provided as a computer program product, for instance in the form of a data carrier carrying computer program code for performing embodiments herein when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

The advantages of some of the embodiments herein may comprise

- An improved robustness and performance of noise power floor estimation at the onset of long duration noise power floor changes, e.g. caused by in-band interference external to the WCDMA system. As the limitation of change or change rate evens out
- A reduced noisyness after a large negative step of the thermal noise power floor, e.g. caused by the termination of an in-band interference external to the WCDMA system, since the estimated mean power, which is used in the estimation of the thermal noise power floor, is reduced.
- An enhanced performance of the enhanced uplink, i.e. the mobile broadband in the radio communications network, since EUL blocking and overscheduling are both avoided by embodiments herein.

Figure 8:
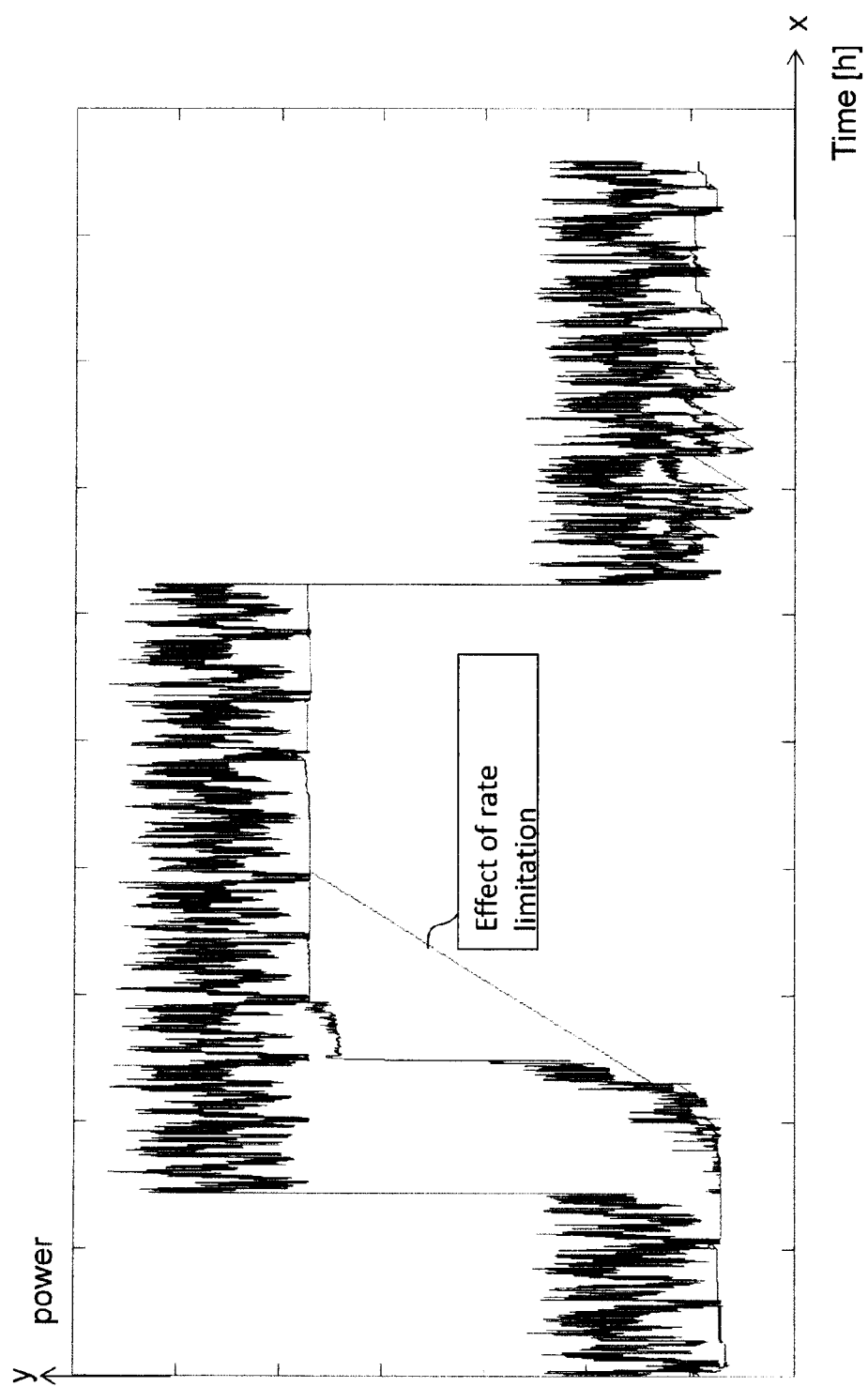
FIG. 8 illustrates the effect of rate of change limitation according to embodiments herein.

The effect of the rate limitation is depicted in FIG. 8. Power is defined along a y-axis and time is defined along an x-axis. A top curve defines the estimated RTWP, a middle curve defines the thermal noise power floor estimate and a lower curve defines a thermal noise power floor estimate according to embodiments herein.

FIG. 8 illustrates the effect of rate limitation illustrated by the marked curve, also marked in the plot. Estimated RTWP (the noisy curve); estimated noise floor (middle curve), and compensated estimated noise floor (curve marked as effect of rate limitation).

Figure 9:
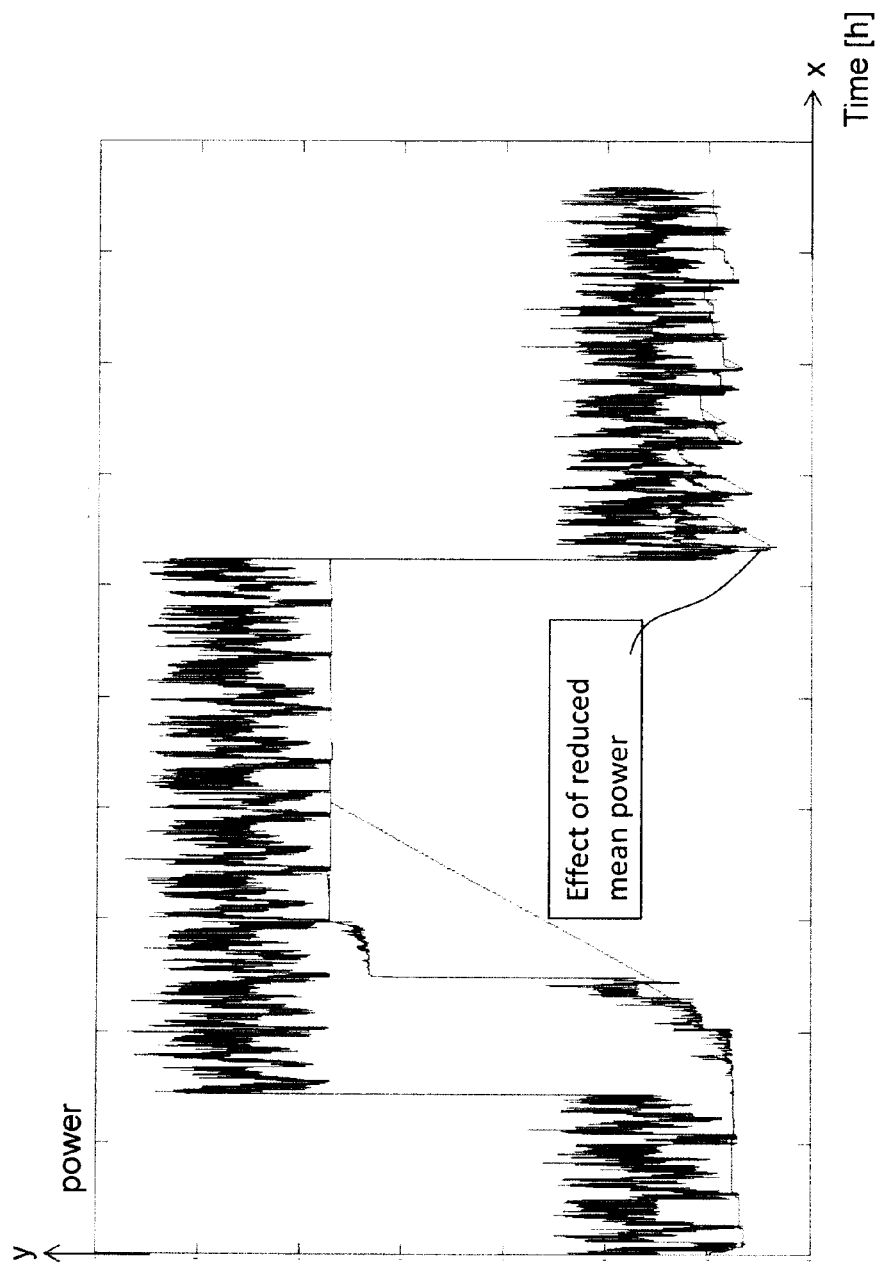
FIG. 9 illustrates the effect of reduced mean power according to embodiments herein.

The effect of the negative step improvement appears in FIG. 9. A comparison between FIG. 8 and FIG. 9 shows an improved size and settling at the negative step occurring after 14 h. FIG. 9 discloses the effect of negative step transient improvement. Power is defined along a y-axis and time is defined along an x-axis.

Figure 10:
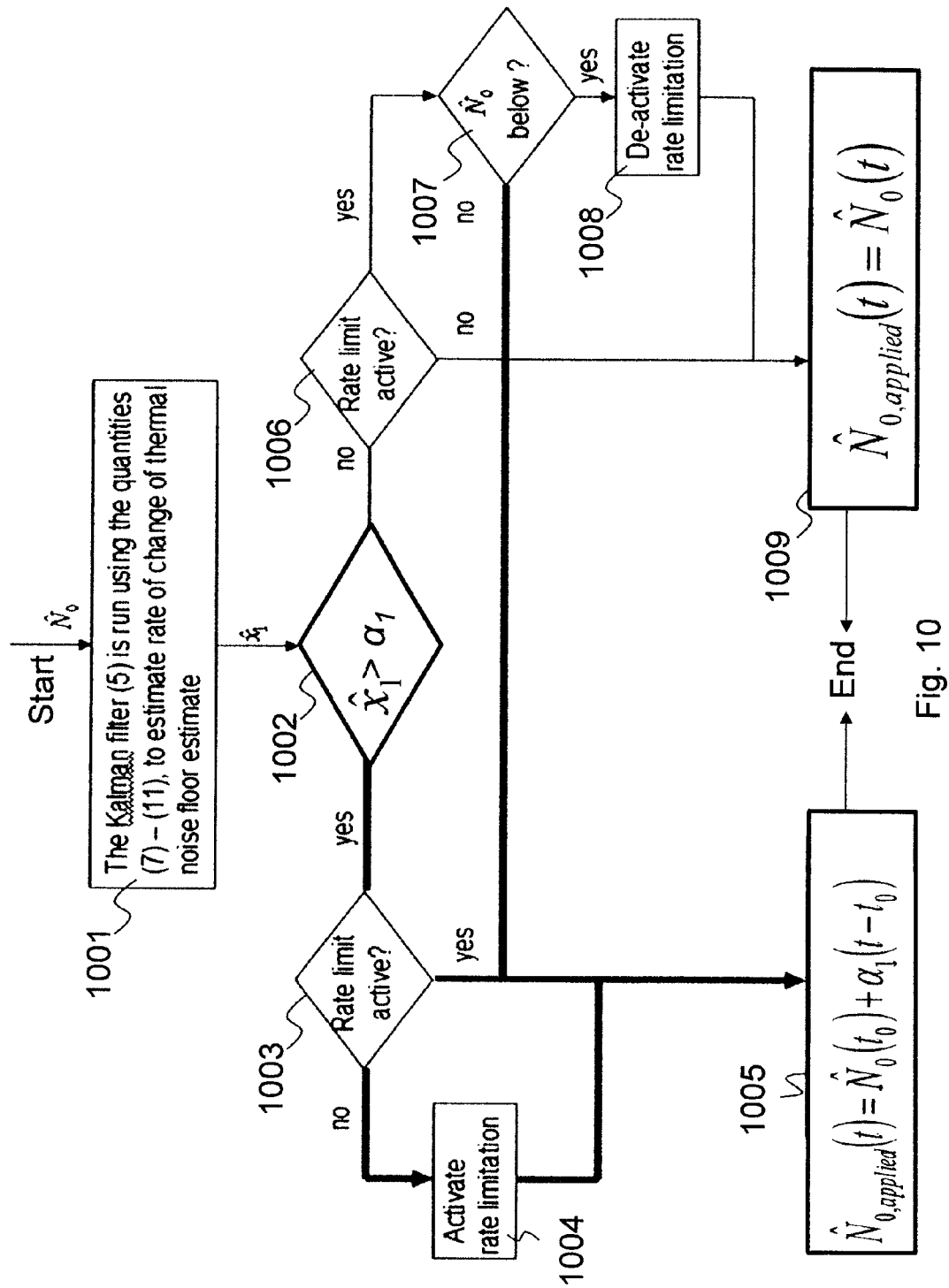
FIG. 10 is a schematic flow chart depicting a method for estimating noise floor according to embodiments herein.

FIG. 10 is a flow chart depicting some embodiments herein.

Action 1001. The radio base station 12 runs a Kalman filter (eqs. (5)) using quantities or parameters from eq. (7)-(11) to estimate rate of change of thermal noise power floor.

Action 1002. The radio base station 12 compares the rate of change with the first threshold value $\alpha_1$.

Action 1003. When the rate of change is bigger than the first threshold value $\alpha_1$, the rate limitation should be performed. The radio base station 12 checks whether a rate limitation process is active.

Action 1004. The radio base station 12 may activate the rate limitation when not up and running.

Action 1005. In case a rate limitation process is already running, the rate limitation will continue. And in case the rate limitation is activated, the radio base station 12 computes the estimated thermal noise power floor using the eq. (12):

$$\hat{N}_{0,applied}(t) = \hat{N}_0(t_0) + \alpha_1(t-t_0)$$

Action 1006. In case the rate of change is below the first threshold $\hat{N}_{0,applied}(t) = \hat{N}_0(t_0) + \alpha_1(t-t_0)$, the radio base station 12 checks whether the rate limitation is active.

Action 1007. In case the rate limitation is active, the radio base station 12 checks whether the thermal noise power floor estimate is below a set thermal noise power floor value.

Action 1008. When the thermal noise power floor estimate is below the set thermal noise power floor estimate the radio base station 12 deactivates the rate limitation process. When the thermal noise power floor estimate is not below the set thermal noise power floor estimate the radio base station 12 may continue to perform rate limitation (see action 1005).

Figure 11:
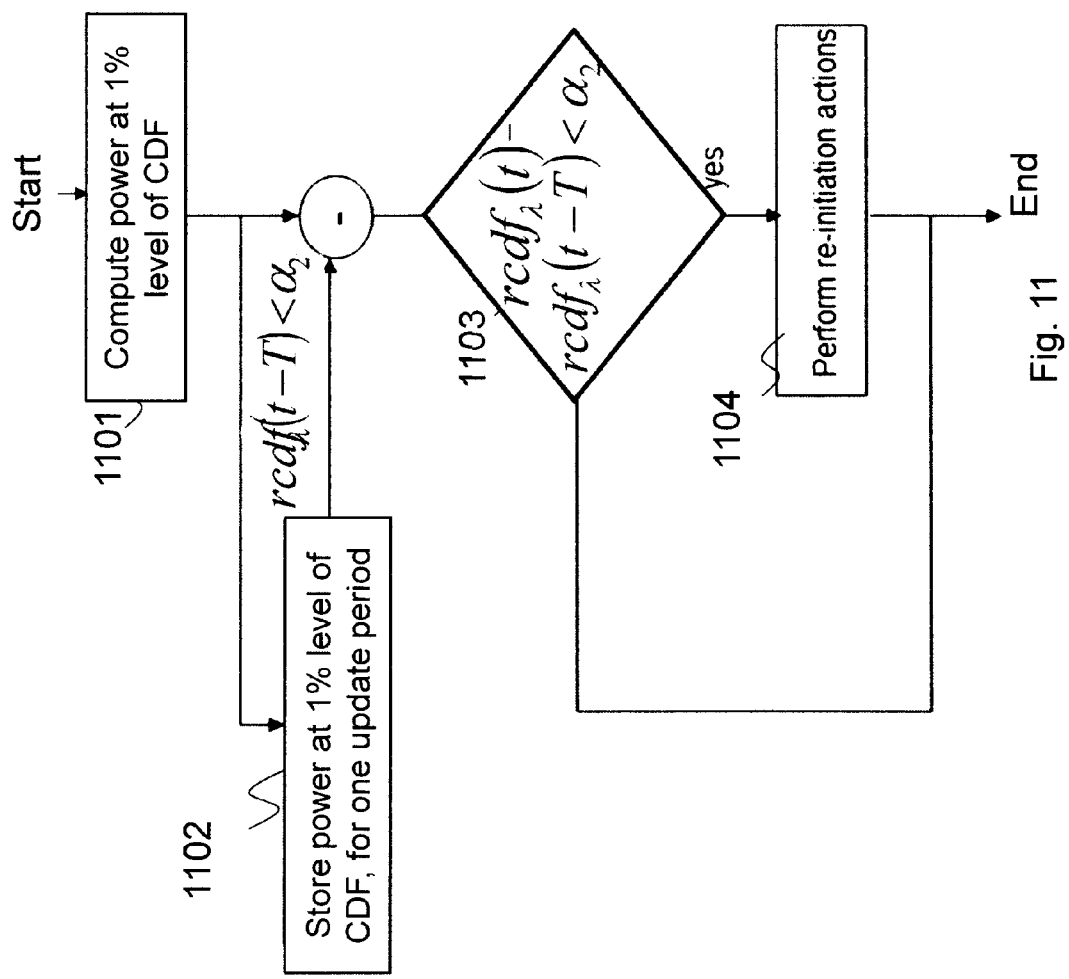
FIG. 11 is a schematic flow chart depicting a method for estimating noise floor according to embodiments herein.

Action 1009. When the rate limitation is not active, the radio base station 12 estimates the thermal noise power floor as previously $\hat{N}_{0,applied} = \hat{N}_0(t)$ FIG. 11 is a flow chart depicting some embodiments herein.

Action 1101. The radio base station 12 computes power at 1% level of the Cumulative Distribution Function (CDF).

Action 1102. The radio base station 12 stores power at 1% level of the CDF, for one update period.

Action 1103. The radio base station 12 then compares a difference between certain levels of CDF at different times with a second threshold value $\alpha_2$.

Action 1104. When the difference is smaller than the second threshold value $\alpha_2$, the radio base station 12 performs re-initiation actions.

Otherwise, the radio base station 12 continues as previously.

Figure 12:
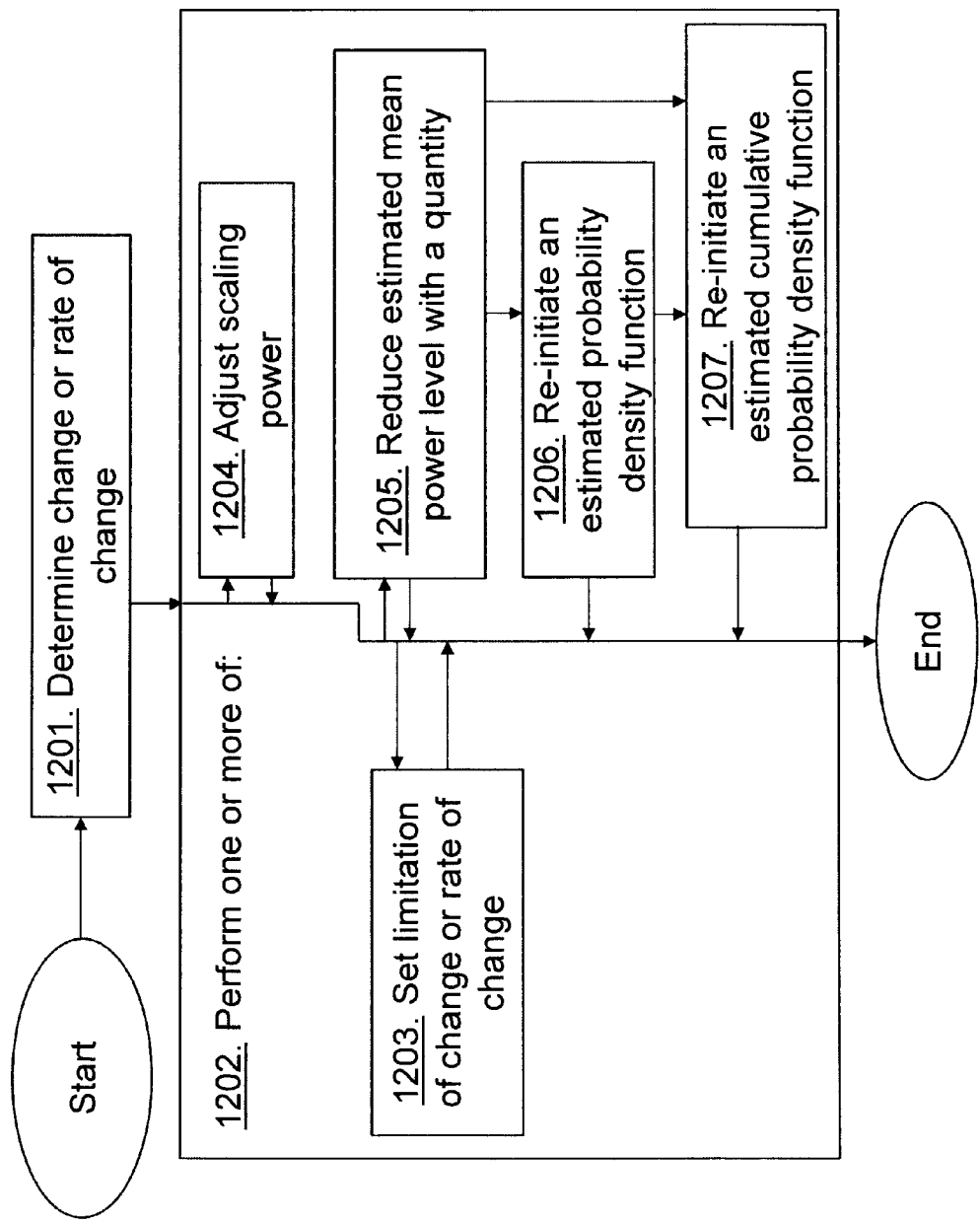
FIG. 12 is a schematic overview depicting a flowchart in a radio base station according to embodiments herein.

The method actions in the radio base station 12 for handling thermal noise power floor in a thermal noise power floor estimation according to some embodiments will now be described with reference to a flowchart depicted in FIG. 12. The actions do not have to be taken in the order stated below, but may be taken in any suitable order. Actions performed in some embodiments are marked with dashed boxes Action 1201. The radio base station 12 determines a change or a rate of change of a thermal noise power floor estimate relative a previous thermal noise power floor estimate. This may be performed in a Kalman Filter in the radio base station 12. The change may be defined by a difference between a current value, based on a determined level, and a value at the previous update step of the thermal noise floor estimate. The determined level may be defined to be a specific level of the estimated cumulative distribution function of the thermal noise floor estimation.

Action 1202. The radio base station 12 performs when the change or rate of change exceeds a threshold value one or more of the following actions.

Action 1203. The radio base station sets a limitation of the change or rate of change to be below the threshold. The rate limitation may continue until an estimated thermal noise power floor falls below a noise floor as calculated according to a maximum allowed rate of change. The limitation may be set by setting the thermal noise power floor estimate to:

$$\hat{N}_{0,applied}(t) = \hat{N}_0(t_0) + \alpha_1(t-t_0)$$

where $\hat{N}_{0,applied}(t)$ is an applied noise floor estimate at time t, $\hat{N}_0(t_0)$ is the estimate of the thermal noise power floor that was valid when rate limitation was triggered, $t_0$ is a time of trigger, and $\alpha_1$ is the threshold value for the rate of change.

Action 1204. Additionally or alternatively, the radio base station 12 adjusts a scaling power.

Action 1205. Additionally or alternatively, the radio base station 12 reduces an estimated mean power level with a quantity dependent on a reduction of the thermal noise power floor estimate.

In case the change is a reduction of the thermal noise power floor estimate that is larger than the threshold value, the estimated mean power level is reduced with a quantity dependent on the reduction of the thermal noise power floor estimate, and at least one of the following actions is performed:

Action 1206. The radio base station 12 may re-initiate an estimated probability density function of the thermal noise power floor at a level indicated by the estimated mean power level.

Action 1207. The radio base station 12 may re-initiate an estimated cumulative probability density function of the thermal noise power floor, at a level indicated by the estimated mean power level.

In some embodiments, the radio base station 12 measures the reduction of the estimated thermal noise power floor at each update of the thermal noise power floor estimate.

In order to perform the method a radio base station 12 is provided. FIG. 13 discloses a block diagram depicting the radio base station 12 for handling thermal noise power floor in a thermal noise power floor process.

The radio base station 12 comprises a determining circuit 1301 configured to determine a change or a rate of change of a thermal noise power floor estimate relative a previous thermal noise power floor estimate. The change may be defined by a difference between a current value, based on a determined level, and a value at the previous update step of the thermal noise floor estimate. The determined level may be defined to be a specific level of the estimated cumulative distribution function of the thermal noise power floor estimation. The determining circuit 1301 may be comprised in a Kalman Filter in the radio base station 12.

The radio base station 12 further comprises a performing circuit 1302 configured to perform, when the change or rate of change exceeds a threshold value, one or more of the following operations: setting a limitation of the change or rate of change to be below the threshold; adjusting a scaling power, and reducing an estimated mean power level with a quantity dependent on a reduction of the thermal noise power floor estimate.

The performing circuit 1302 may be configured to reduce, in case the change is a reduction of the thermal noise power floor estimate that is larger than the threshold value, the estimated mean power level with a quantity dependent on the reduction of the thermal noise power floor estimate, and further configured to perform at least one of the following actions: re-initiate an estimated probability density function of the thermal noise power floor at a level indicated by the estimated mean power level; and re-initiate an estimated cumulative probability density function of the thermal noise power floor, at a level indicated by the estimated mean power level. The determining circuit 1301 may then be configured to measure the reduction of the estimated thermal noise power floor at each update of the thermal noise power floor estimate. The performing circuit 1302 may in some embodiments be configured to continue the rate limitation until an estimated thermal noise power floor falls below a noise floor as calculated according to a maximum allowed rate of change. In some embodiments, the performing circuit 1302 is configured to set the limitation by setting the thermal noise power floor estimate to:

$$\hat{N}_{0,applied}(t) = \hat{N}_0(t_0) + \alpha_1(t-t_0)$$

where $\hat{N}_{0,applied}(t)$ is an applied noise floor estimate at time t, $\hat{N}_0(t_0)$ is the estimate of the thermal noise power floor that was valid when rate limitation was triggered, $t_0$ is a time of trigger, and $\alpha_1$ is the threshold value for the rate of change.

The embodiments herein for handling thermal noise power floor may be implemented through one or more processors 1303 in the radio base station 12 depicted in FIG. 13, together with computer program code for performing the functions and/or method actions of the embodiments herein. The program code mentioned above may also be provided as a computer program product, for instance in the form of a data carrier carrying computer program code for performing embodiments herein when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

The radio base station 12 also comprises a receiver, RX, 1304 and a transmitter, Tx, 1305, configured to receive and transmit data/signals. Furthermore, the radio base station 12 comprises a memory 1306. The memory comprises one or more memory units arranged to store data such as thermal noise power floor estimates, RoTs, thresholds, power, applications to execute method herein, and similar.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

ABBREVIATIONS

ASIC Application Specific Integrated Circuit
CPU Central Processing Unit
DSP Digital Signal Processor
EUL Enhanced Uplink
FPGA Field Programmable Gate Array
NO Thermal noise power floor level
RoT Rise over Thermal
RBS Radio Base Station
RTWP Received Total wideband Power
WCDMA Wideband Code Division Multiple Access

LIST OF CLOSELY RELATED REFERENCES

[1] T. Wigren, "Soft uplink load estimation in WCDMA", IEEE Transactions on Vehicular Technology, vol. 58, no. 2, pp. 760-772, 2009.
[2] T. Wigren, "Estimation of uplink WCDMA load in a single RBS", IEEE VTC 2007 Fall, Baltimore, USA, 2007.
[3] T. Wigren, "Recursive noise floor estimation in WCDMA", IEEE Transactions on Vehicular Technology, vol. 59, no. 5, pp. 2615-2620, 2010.

The invention claimed is:

1. A method in a radio base station for handling a thermal noise power floor in a thermal noise power floor estimation process, comprising:
  determining a change or a rate of change of a thermal noise power floor estimate relative to a previous thermal noise power floor estimate; and
  when the change or rate of change exceeds a threshold value, performing one or more of the following: setting a limitation of the change or rate of change to be below the threshold value; adjusting a scaling power; and reducing an estimated mean power level with a quantity dependent on a reduction of the thermal noise power floor estimate,
  wherein, in case the change or rate of change is a reduction of the thermal noise power floor estimate that is larger than the threshold value, the estimated mean power level is reduced with a quantity dependent on the reduction of the thermal noise power floor estimate, and at least one of the following actions is performed: re-initiating an estimated probability density function of the thermal noise power floor at a level indicated by the estimated mean power level; and re-initiating an estimated cumulative probability density function of the thermal noise power floor, at a level indicated by the estimated mean power level.

2. The method according to claim 1, wherein the reduction of the estimated thermal noise power floor is measured at each update of the thermal noise power floor estimate.

3. The method according to claim 2, wherein the change is defined by a difference between a current value, based on a determined level, and a value at the previous update step of the thermal noise power floor estimate.

4. The method according to claim 3, wherein the determined level may be defined to be a specific level of an estimated cumulative distribution function of the thermal noise power floor estimation.

5. The method according to claim 1, wherein the rate limitation continues until an estimated thermal noise power floor falls below a noise floor as calculated according to a maximum allowed rate of change.

6. The method according to claim 1, wherein setting the limitation is performed by setting the thermal noise power floor estimate to:

$$\hat{N}_{0,applied}(t) = \hat{N}_0(t_0) + \alpha_1(t-t_0)$$

where $N_{0,applied}(t)$ is an applied noise floor estimate at time t, $\hat{N}_0(t_0)$ is the estimate of the thermal noise power floor that was valid when rate limitation was triggered, $t_0$ is a time of trigger, and $\alpha_1$, is the threshold value for the rate of change.

7. The method according to claim 1, wherein the determining is performed in a Kalman Filter in the radio base station.

8. A radio base station for handling a thermal noise power floor in a thermal noise power floor estimation process, comprising:
 a determining circuit configured to determine a change or a rate of change of a thermal noise power floor estimate relative to a previous thermal noise power floor estimate; and
 a performing circuit configured to perform, when the change or rate of change exceeds a threshold value, one or more of the following operations: setting a limitation of the change or rate of change to be below the threshold value; adjusting a scaling power; and reducing an estimated mean power level with a quantity dependent on a reduction of the thermal noise power floor estimate,
 wherein the performing circuit is configured to reduce, in case the change or rate of change is a reduction of the thermal noise power floor estimate that is larger than the threshold value, the estimated mean power level with a quantity dependent on the reduction of the thermal noise power floor estimate, and further configured to perform at least one of the following actions: re-initiate an estimated probability density function of the thermal noise power floor at a level indicated by the estimated mean power level; and re-initiate an estimated cumulative probability density function of the thermal noise power floor, at a level indicated by the estimated mean power level.

9. The radio base station according to claim 8, wherein the determining circuit is configured to measure the reduction of the estimated thermal noise power floor at each update of the thermal noise power floor estimate.

10. The radio base station according to claim 9, wherein the change is defined by a difference between a current value, based on a determined level, and a value at the previous update step of the thermal noise power floor estimate.

11. The radio base station according to claim 10, wherein the determined level may be defined to be a specific level of an estimated cumulative distribution function of the thermal noise power floor estimation.

12. The radio base station according to claim 8, wherein the performing circuit is configured to continue the rate limitation until an estimated thermal noise power floor falls below a noise floor as calculated according to a maximum allowed rate of change.

13. The radio base station according to claim 8, wherein the performing circuit is configured to set the limitation by setting the thermal noise power floor estimate to:

$$\hat{N}_{0,applied}(t) = \hat{N}_0(t_0) + \alpha_1(t-t_0)$$

where $\hat{N}_{0,applied}(t)$ is an applied noise floor estimate at time t, $\hat{N}_0(t_0)$ is the estimate of the thermal noise power floor that was valid when rate limitation was triggered, $t_0$ is a time of trigger, and $\alpha_1$, is the threshold value for the rate of change.

14. The radio base station according to claim 8, wherein the determining circuit is comprised in a Kalman Filter in the radio base station.

* * * * *